United States Patent
Suzuki et al.

(10) Patent No.: US 9,050,951 B2
(45) Date of Patent: Jun. 9, 2015

(54) VEHICLE DECELERATION CONTROL UNIT, VEHICLE DECELERATION CONTROL METHOD

(75) Inventors: Tatsuya Suzuki, Yokohama (JP); Kazuma Oura, Atsugi (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 132 days.

(21) Appl. No.: 13/980,229

(22) PCT Filed: Dec. 21, 2011

(86) PCT No.: PCT/JP2011/007183
§ 371 (c)(1),
(2), (4) Date: Jul. 17, 2013

(87) PCT Pub. No.: WO2012/101725
PCT Pub. Date: Aug. 2, 2012

(65) Prior Publication Data
US 2013/0304335 A1     Nov. 14, 2013

(30) Foreign Application Priority Data

Jan. 25, 2011  (JP) ................. 2011-013226
Jun. 29, 2011  (JP) ................. 2011-144470
Jun. 29, 2011  (JP) ................. 2011-144471

(51) Int. Cl.
G06F 19/00    (2011.01)
B60T 8/17     (2006.01)
B60W 10/184   (2012.01)
B60W 30/18    (2012.01)
B60W 10/18    (2012.01)

(52) U.S. Cl.
CPC ............... *B60T 8/17* (2013.01); *B60W 10/184* (2013.01); *B60W 30/18136* (2013.01); *B60W 10/18* (2013.01); *B60W 30/18109* (2013.01); *B60W 2520/105* (2013.01); *B60W 2540/12* (2013.01); *B60T 2201/04* (2013.01); *B60T 2260/04* (2013.01)

(58) Field of Classification Search
None
See application file for complete search history.

(56) References Cited

U.S. PATENT DOCUMENTS 5,514,050 A   5/1996  Bauerle et al.
6,095,942 A   8/2000  Yamaguchi et al.
(Continued)

FOREIGN PATENT DOCUMENTS

JP    59073651 A     4/1984
JP    H06323416 A   11/1994
(Continued)

*Primary Examiner* — Thomas Tarcza
*Assistant Examiner* — Garrett Evans
(74) *Attorney, Agent, or Firm* — Young Basile

(57) ABSTRACT

Provided herein is a unit and method to assist the driver with brake operation and to lessen the operation burden. This vehicle deceleration control unit is provided with an engine brake that decelerates the vehicle by putting the vehicle in a state in which the power source is driven from the driven side, and when the driver holds brake operation, the deceleration caused by the engine brake is increased at a first rate. Then, once a predetermined time has elapsed after increasing the deceleration at the rise-up rate, the deceleration is increased from the deceleration at that time further at a second rate that is less than the Rise-up rate. Further, when the driver is increasing or decreasing the brake operation, i.e., does not hold the brake operation, the deceleration due to the engine brake is maintained.

19 Claims, 26 Drawing Sheets

(56) References Cited

U.S. PATENT DOCUMENTS

| | | | |
|---|---|---|---|
| 6,192,307 | B1 | 2/2001 | Okamoto et al. |
| 6,739,677 | B2 | 5/2004 | Tazoe et al. |
| 2005/0187694 | A1 | 8/2005 | Shiiba et al. |
| 2007/0252432 | A1 | 11/2007 | Takamatsu |

FOREIGN PATENT DOCUMENTS

| | | |
|---|---|---|
| JP | 2000062501 A | 2/2000 |
| JP | 2000065196 A | 3/2000 |
| JP | 2003306138 A | 10/2003 |

Deceleration control process start
S11 Control permission setting process
S12 Hold determination flag setting
S13 Bulk-up rate calculation process
S14 Rise-up rate accumulating process
S15 Build-up rate accumulating process
S16 Upper limit setting
S17 Bulk-up deceleration calculation
Return

VEHICLE DECELERATION CONTROL UNIT, VEHICLE DECELERATION CONTROL METHOD

TECHNICAL FIELD

The present invention relates to a deceleration control device and deceleration control method for a vehicle.

BACKGROUND

Japanese Laid-Open Patent Application Publication No. JP H06-323416 discloses a technique in which the vehicle speed on a downhill is maintained to be constant, or the wheel slip is suppressed by way of engine brake control by a continuously variable transmission. Further, in Japanese Laid-Open Patent Application Publication No. JP S59-073651, engine brake effect is enhanced and burden of brake operation is lessened by causing the speed of the continuously variable transmission from high ratio to low ratio upon detection of the driver's brake operation. As described in these, by controlling the transmission ratio (speed ratio) of the continuously variable transmission (CVT), it is known to impart an engine brake. However, in reality, it is difficult to obtain a smooth deceleration effect, and in particular, controlling at the vehicle stopping operation has been difficult.

On the other hand, in Japanese Laid-Open Patent Application Publication No. JP 2000-065196, a vehicle speed at which the driver's brake operation has been released is stored as a brake release vehicle speed, and when the subsequent vehicle speed becomes higher than the brake release vehicle speed, engine brake will be increased in accordance with the speed deviation and road gradient.

In Japanese Laid-Open Patent Application Publication No. JP 2000-065196 described above, since the engine brake is controlled according to the vehicle speed following the brake release operation of the driver, in such a scene in which the driver presses on the brake pedal progressively as the vehicle approaches the preceding vehicle or the stop line, a positive deceleration control would not be available. Stated another way, the driver by him or herself has to take corrective operation by him- or herself in the form of further depression on brake pedal and the like. Thus, it remains area of improvement in terms of the operational assistance.

BRIEF SUMMARY

The purpose of the present invention is to assist the driver with brake operations and to lessen the operation burden. The vehicle deceleration control device pertaining to one embodiment according to the present invention is provided with a deceleration control unit to impart the deceleration to the vehicle in a state in which the vehicle drive or power source is driven by the driven side. When the driver maintains or holds the brake operation, then the deceleration will be increased at a first increase rate. Then, when a predetermined time has elapsed after the increase in deceleration at the first increase rate, deceleration will be increased further at the second increase rate lower than the first increase rate.

According to the vehicle deceleration control device pertaining to an embodiment of the present invention, when the driver maintains the brake operation, since the deceleration is firstly increased at a first increase rate, at the initial stage of brake operation, the driver may feel effectiveness of brake (biting engagement). Subsequently, since the deceleration is increased at a second increase rate less than the first increase rate, braking force gradually increases from the mid- to final stage of the brake operation. Therefore, as the vehicle approaches the preceding vehicle or the stop line, the driver would be less required to take a corrective action so that the tendency to depress the brake pedal further may be suppressed. Thus, the brake operation of the driver is assisted and the operative burden is reduced.

BRIEF DESCRIPTION OF THE DRAWINGS

The description herein makes reference to the accompanying drawings wherein like reference numerals refer to like parts throughout the several views, and wherein.

DETAILED DESCRIPTION

One embodiment of the present invention will now be described below with reference to the accompanying drawings.

Figure 1:
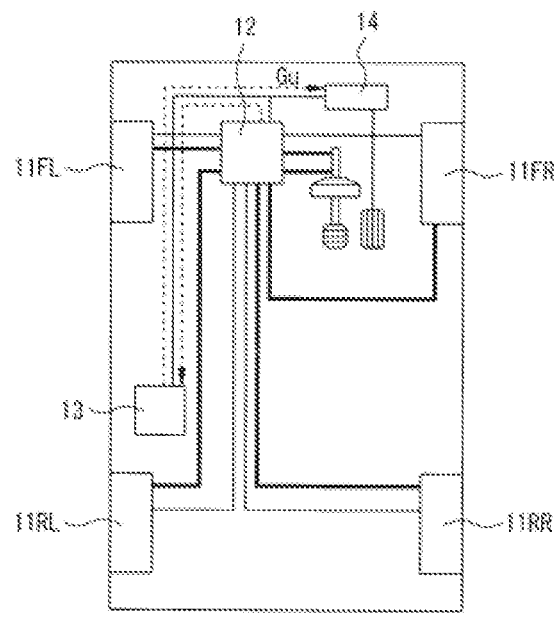
FIG. 1 is a block diagram of the deceleration control device.

FIG. 1 is a block diagram of the deceleration control device. The deceleration control device is provided with wheel speed sensors 11FL~11RR for detecting the speed of each wheel, a brake actuator 12 with a built-in master pressure sensor for detecting the brake operation of the driver, a vehicle control controller 13 for controlling the vehicle deceleration, and a power train controller 14 for achieving the braking force. Note that the wheel speed sensors 11FL to 11RR correspond to a part of the "vehicle speed detection unit.

Using communications such as CAN, the vehicle control controller 13 receives the wheel speed sensor value of each wheel and a master cylinder sensor value, and calculates the boost or bulk-up deceleration Gu, and transmits the command regarding the bulk-up deceleration Gu to the power train controller 14.

The power train controller 14 receives command values and executes an engine brake control. The control on engine brake may be executed by controlling the gear position or speed ratio of the transmission (CVT) or may be obtainable through control of engine accessories (such as regenerative alternator).

Figure 2:
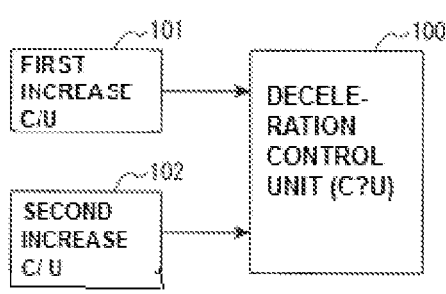
FIG. 2 is a block diagram showing a main part of the deceleration control process.

The following describes the main portion of the deceleration control process to be executed by the vehicle control controller 13. FIG. 2 is a block diagram showing a main part of the deceleration control process. The deceleration control process is provided with deceleration control 100, first increase control unit 101, and second increase control unit 102. The deceleration control 100 provides a deceleration to the vehicle by driving the vehicle driving source from the driven side.

The first increase control unit 101 increases the deceleration by the deceleration control unit 100 at the first increase rate when the driver maintains the brake operation.

The second increase control unit 102 increases the deceleration by the deceleration control unit 100 at the second increase rate smaller than the first increase rate, when the drive maintains the brake operation and the first increase control unit 101 has increased the deceleration for the predetermined time.

Figure 3:
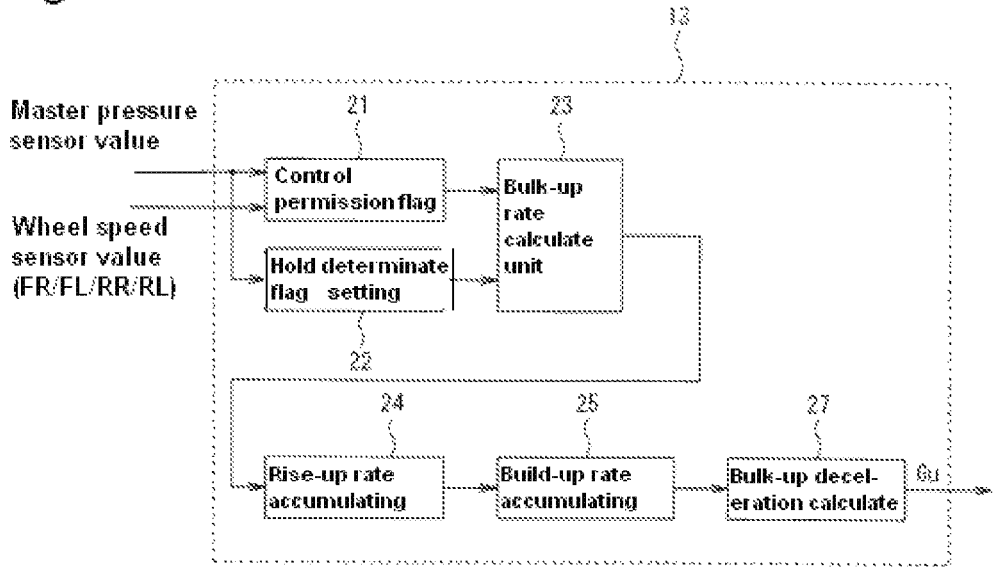
FIG. 3 is a block diagram showing a deceleration control process.

Next, a description will be given of the specific deceleration control process to be executed by the vehicle control controller 13. FIG. 3 is a block diagram showing a deceleration control process. The control permission flag setting unit 21, through CAN, determines on the execution or non-execution of deceleration boost or bulk-up operation based on the master cylinder sensor pressure detecting the driver's operation, wheel speed sensor detecting the status of wheels, and sets a control permission flag fc.

Based on the master pressure sensor value, the hold determination flag setting unit 22 determines whether or not the driver is holding a brake operation, and sets the holding determination flag fh.

The boost or bulk-up rate calculating unit 23 calculates a driver-requested deceleration Gd based on the master pressure sensor value, and, based on the control permission flag fc, hold determination flag fh, and driver-requested deceleration Gd, calculates a rise-up rate Rr at the time of launch (rising up) of engine brake as well as a build-up rate Rb at the time of further increase (build-up) following the launch of the engine brake.

The rise-up rate accumulation unit 24 shows the process in the first increase control unit 101, and, based on the control permission flag fc, hold determination flag fh, and first increase rate Rr (hereinafter referred to as rise-up rate Rr), the rise-up rate accumulation unit 24 calculates a cumulative value Cr of the rise-up rate. This rise-up rate cumulative unit 24 corresponds to "first increase control unit".

The build-up rate accumulation unit 25 shows the process in the second increase control unit 102, and, based on the control permission flag fc, hold determination flag fh, and second increase rate Rb (hereinafter referred to as build-up rate Rb), calculates a cumulative value Cb of the rise-up rate. This build-up rate accumulate unit 25 corresponds to the "second increase control unit".

The boost or bulk-up deceleration calculation unit 27 shows the process at deceleration control unit 100, and the boost or bulk-up deceleration calculation unit 27 calculates a bulk-up deceleration Gu based on the rise-up rate cumulative value Cr, build-up rate cumulative value Cb, and the driver-requested deceleration Gd, and the bulk-up deceleration Gu thus calculated will be sent to power train controller via CAN and the like. This bulk-up deceleration calculating unit 27 corresponds to "deceleration control unit".

Figure 4:
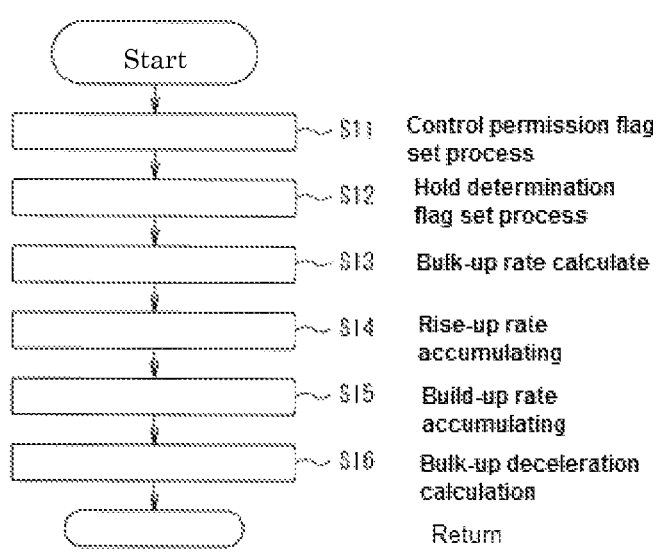
FIG. 4 is a flowchart showing deceleration control process.

FIG. 4 is a flowchart showing deceleration control process. Deceleration control process is performed at each a predetermined time (every 10 msec, for example).

First, in step S11, the control permission flag setting process is executed to be described later, on the basis of the master pressure sensor value, the wheel speed sensor value to determine the necessity of bulk-up deceleration control and sets the control permission flag fc.

In the subsequent step S12, the hold determination flag setting process to be described later is executed on the basis of the master pressure sensor value, to determine whether or not the driver is holding the brake operation, and sets the holding determination flag fh.

In the subsequent step S13, the bulk-up rate calculation process to be described later is executed, and calculates a driver-requested deceleration based on the master pressure sensor value, and, based on the control permission flag, hold determination flag, and driver-requested deceleration, both the rise-up rate and build-up rate are calculated.

In the subsequent step S14, the rise-up rate accumulating process is executed to be described later, and, based on the control permission flag, hold determination flag, and rise-up rate, the raise-up cumulative amount is calculated. This process in step S14 corresponds to the "second increase control unit"

In the subsequent step S16, the bulk-up deceleration calculation process to be described later is executed, and based on the rise-up rate cumulative value, build-up rate cumulative value, and the driver-requested deceleration, the bulk-up deceleration is calculated and sent to power train controller 14. The process in this step S16 corresponds to "deceleration control unit".

Figure 5:
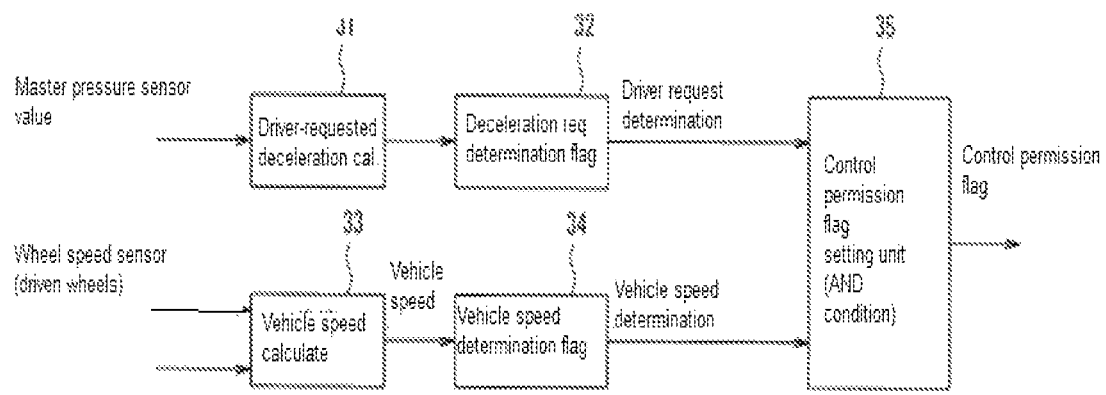
FIG. 5 is a block diagram showing a control permission flag setting process.

The following describes control permission or enabling flag setting process. FIG. 5 is a block diagram showing a control permission flag setting process. The driver-requested deceleration calculation unit 31 calculates the driver-requested deceleration in accordance with the master pressure sensor value. This driver-requested deceleration calculation unit 31 corresponds to "requested deceleration calculation unit".

The deceleration request determination flag setting unit 32 determines whether or not the driver-requested deceleration Gd is equal to or greater than a predetermined threshold value Gt1 (0.05 G, for example), and if Gd≥Gt1, then it is determined that the driver requests a deceleration and the deceleration request determination flag is set to fd=1. On the other hand, if Gd<Gd1, it is determined that the driver does not wish a deceleration and the deceleration request determination flag fd is set to zero, i.e., fd=0.

Note that, in order to avoid occurrence of hunting of the deceleration request determination flag, once the deceleration request determination flag fd has been set to 1, when the driver-requested deceleration Gd falls below a predetermined threshold Gt2 (0.02 G, for example) which is less than the threshold Gt1, the deceleration request determination flag fd will be reset to zero, i.e., "fd=0".

The vehicle speed calculating unit 33 reads wheel speed sensor values associated with driven wheels, for example, and calculates a vehicle speed as the average value of the two wheel speed readings. This vehicle speed calculating unit 33 corresponds to "vehicle speed detection unit".

The vehicle speed determination flag setting unit 34 determines whether or not the vehicle speed V exceeds a predetermined threshold value Vt1 (40 km/h for example), and if V≥Vt1, it is determined that the deceleration is required to be boosted upon driver's request, and vehicle speed determination flag is set to one, i.e., fv=1.

On the other hand, if V<Vt1, it is determined that the deceleration is not needed to be raised in bulk-up fashion even at the driver's deceleration request, and the vehicle speed determination flag fv is reset to zero, i.e., fv=0. Note that, in order to avoid hunting of vehicle speed determination flag, once the vehicle speed determination flag fv has been set to one, then vehicle speed determination flag fv may be reset to zero, when vehicle speed falls below a threshold Vt2 (30 km/h for example) less than the threshold Vt1 described above.

The control permission flag setting unit 35 determines that the deceleration has to be boosted when the deceleration request determination flag, fd equals to "1", and the vehicle speed determination flag, fv equals to "1", and sets the control permission flag fc to "1", i.e., fc=1. On the other hand, when either deceleration request determination flag fd is "zero" or vehicle speed determination flag, fv is "zero", it is determined that no need exists to boost the deceleration and the control permission flag fc will be reset to "zero".

Figure 6:
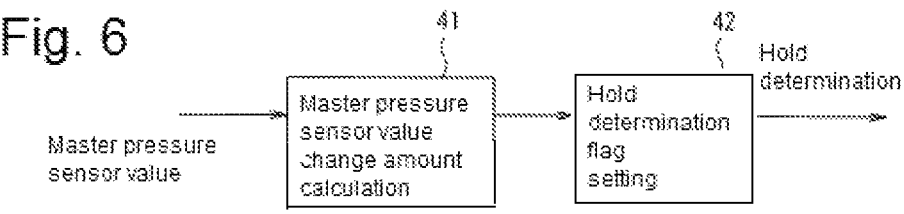
FIG. 6 is a block diagram illustrating a hold determination flag setting process.

The following describes a hold determination flag setting process. FIG. 6 is a block diagram illustrating a hold determination flag setting process. The master pressure sensor change amount calculating unit 41 calculates a change ΔP with respect to the previous value of master pressure sensor.

The hold determination flag setting unit 42 determines whether or not the absolute value of the master pressure sensor value change amount ΔP is less than a previously determined threshold value Pt, and if |ΔP|≤Pt, it is determined that the driver holds the brake operating amount and the hold determination flag, fh is set to "1". On the other hand, if |ΔP|≤Pt, it is determined that the driver either increases the brake operation amount or decreases the same, and the holding determination flag, fh is reset to "zero".

Figure 7:
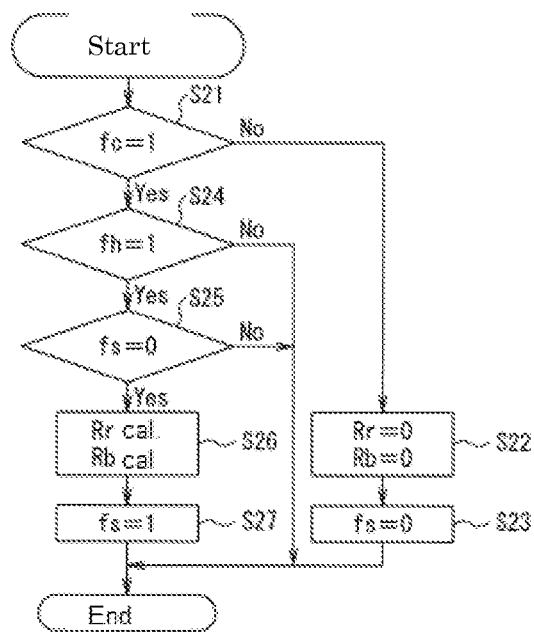
FIG. 7 is a flow chart illustrating a process for calculating the increase rate.

The following describes the bulk-up rate or raising rate calculation process. FIG. 7 is a flowchart showing a bulk-up rate or raising rate calculation process. Firstly, in step S21, it is determined whether or not the control permission flag, fc is set to "1". When the determination results in fc being "0", the bulk-up of deceleration is determined not necessary, and control proceeds to step S22. On the other hand, if the determination result indicates fc being "1", bulk-up of deceleration is determined to be necessary and process proceeds to step S24.

In step S22, as shown below, both the rise-up rate, Rb and build-up ratio Rr are reset: Rr=0 and Rb=0.

In the subsequent step S23, after resetting the set flag to "0", control ends this bulk-up rate calculating step.

On the other hand, in step S24, it is determined whether or not the hold determination flag is set to "1".

If the determination result turns to be fh="1", control ends the bulk-up rate calculating process. If the determination result indicates fh being "one", control proceeds to step S25.

In step S25, it is determined whether or not the set flag fs is reset to "0". When the determination result indicates fs being "1", it is determined that both the rise-up rate Rr and build-up rate Rb have been set, and control ends the bulk-up rate calculation process. On the other hand, if set flag fs equals to "0", it is determined that both the rise-up rate Rr and build-up rate Rb have not been set, and control proceeds to step S26.

In step S26, with reference to the map, depending on the current driver-requested deceleration Gd, both the rise-up rate Rr and build-up rate Rb are calculated. This process of step S26 corresponds to "increase rate setting unit".

Figure 8:
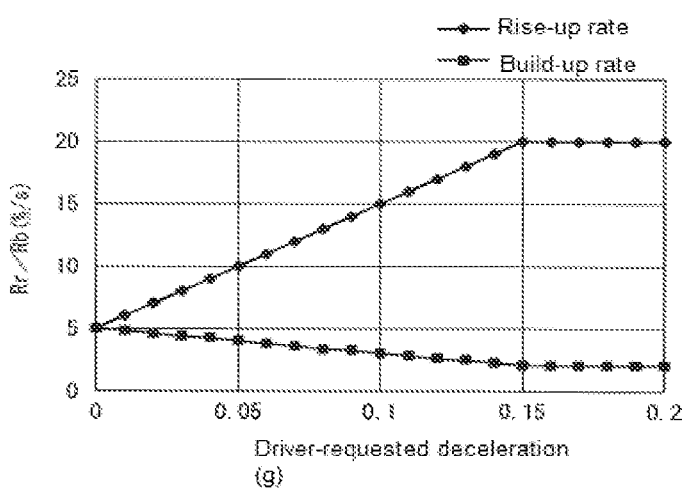
FIG. 8 is a map used to calculate the rise-up rate and build-up rate.

FIG. 8 is a map used to calculate the rise-up rate and build-up rate. When the driver-requested deceleration Gd is "0", both the rise-up rate Rr and build-up rate Rb are in a range greater than "0" and less than "1", and assume the same value. In addition, as the driver-requested-deceleration Gd increases, rise-up rate Rr increases, whereas build-up rate Rb decreases in a range larger than "0". Moreover, the change amount in rise-up rate with respect to the change amount of driver-requested deceleration Gd, i.e., gradient, becomes larger than the change amount in build-up rate with respect to the change amount of the driver-requested deceleration Gd.

In the subsequent step S27, the set flag ds is set to "1", and the control ends this bulk-up rate calculation process.

Figure 9:
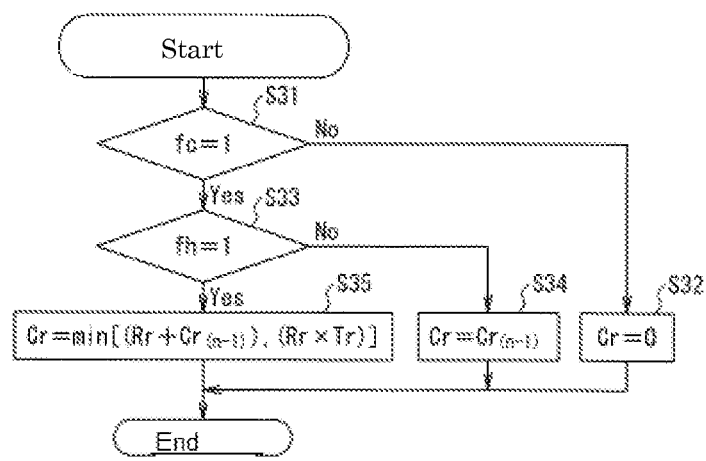
FIG. 9 is a flow chart showing the rise-up rate accumulating process.

Next, a description will be given of the rise-up rate accumulating process. FIG. 9 is a flowchart showing a rise-up rate accumulating process. First, in step S31, it is determined whether nor not the control permission flag, fc is set to "1". When the determination result indicates fc being "0", bulk-up of deceleration is determined unnecessary, and control proceeds to step S32. On the other hand, when the determination result reveals fc being "1", bulk-up of deceleration is determined necessary and control proceeds to step S33.

In step S32, as described below, after the rise-up rate cumulative value Cr is reset to "0", this rise-up accumulating process is exited. Cr=0

On the other hand, in step S33, it is determined whether or not the hold determination flag, fh is being set to "1". When the determination result indicates fh being "0", control proceeds to step S34. On the other hand, when the determination result indicates fh being "1", control proceeds to step S35.

In step S34, as shown below, the previous value for rise-up rate cumulative value Cr(n−1) is set as the current value, and the rise-up rate accumulating process will end. In other words, the previous value Cr(n−1) is maintained. The process in step S34 corresponds to "hold control unit". Cr=Cr(n−1)

On the other hand, in step S35, as shown below, after setting a smaller one of the rise-up rate cumulative value (Rr+Cr(n−1)) and the maximum value of rise-up rate (Rr×Tr) as a rise-up rate cumulative value Cr, the rise-up rate accumulating process ends. The process in step S36 corresponds to the "first ending control unit". Cr=min[(Rr+Cr(n−1)), (Rr×Tr)]

Here, Tr is a rise-up time that is set in advance. The rise-up time Tr denotes a maximum time (maximum counts) of rise-up, i.e., during which accumulating may be made by incrementing Rr every calculation or control cycle.

Figure 10:
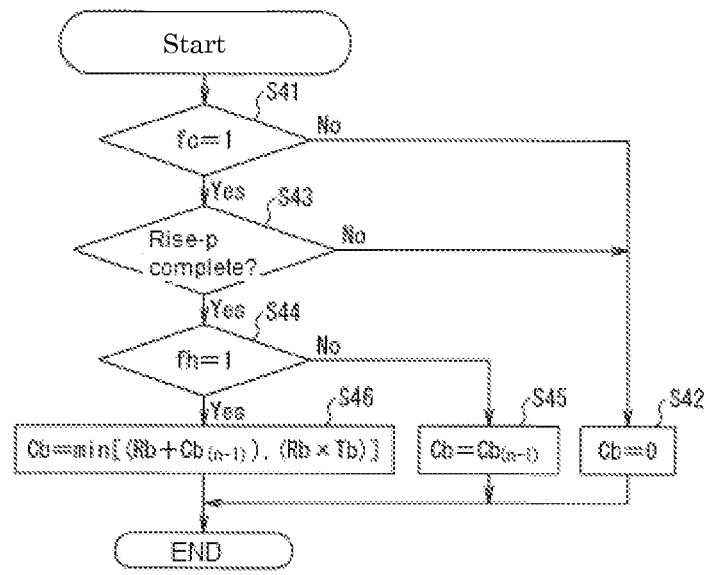
FIG. 10 is a flow chart showing the build-up rate accumulating process.

Now description is made of the build-up rate accumulating process. FIG. 10 is a flowchart showing a build-up rate accumulating process. First in the step S41, it is determined whether or not the control permission or enabling flag, fc is set to "1". When the determination result indicates fc being "0", bulk-up of deceleration is determined unnecessary, and process proceeds to step S42. On the other hand, when determination result indicates that fc is "1", it is determined that bulk-up of deceleration is necessary and control proceeds to step 43.

In step S42, as shown below, the build-up rate cumulative value Cb is reset, and the build-up accumulating process ends. Cb=0.

On the other hand, in step S43, it is determined whether or not the rise-up has completed. More specifically, the rise-up is considered as being complete if the rise-up cumulative value Cr has reached the maximum value (Rr×Tr). When the rise-up has not yet completed, control proceeds to step S42 described above. On the other hand, at completion of rise-up, control advances to step S44.

In step S44, it is determined whether or not the hold determination flag fh is set to "1". If the determination result indicates that fh is equal to "0", control proceeds to step S45 whereas the determination result indicates that fh is equal to "1", then control advances to step S46.

In step S45, as shown below, after setting the previous value of build-up rate cumulative value Cb(n−1) as current Cb and terminates this build-up rate accumulate processing. Stated another way, the previous value Cb(n−1) is retained. The process in this step S45 corresponds to "hold control unit". Cb=Cb(n−1).

On the other hand in step S46, shown below, after setting as build-up rate cumulative value Cb the smaller one of build-up rate cumulative value (Rb+Cb(n−1)), or maximum value of build-up rate, (Rb×Tb), control terminates this build-up accumulating processing. The process in this step S46 corresponds to the "second ending control unit". Cb=min[(Rb+Cb(n−1)), (Rb×Tb)]

Here, Tb is the build-up time that has been set in advance. The build-up time Tb represents a maximum time (maximum number of times) that can be built up, i.e. can be incremented by Bb at every calculating cycle.

Figure 11:
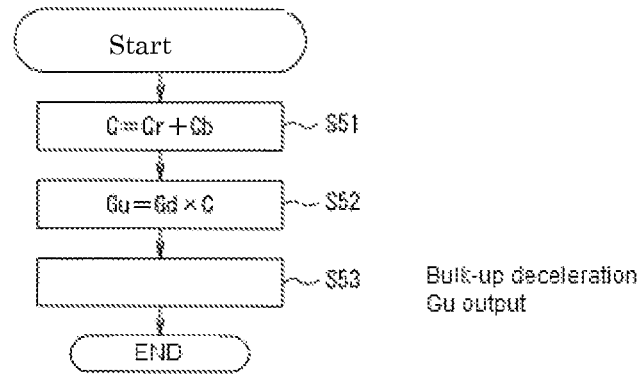
FIG. 11 is a flow chart showing a process of calculating a boost or bulk-up deceleration.

Now, description is made of bulk-up deceleration calculating process. FIG. 11 is a flowchart showing a process of calculating a bulk-up deceleration. In step S51, first, as shown below, by adding the rise-up rate cumulative value Cr to the build-up rate cumulative value Cb to calculate a bulk-up cumulative value C; C=Cr+Cb.

In step S52, as shown below, by multiplying the bulk-up cumulative value C and driver-requested deceleration Gd to obtain the bulk-up deceleration Gu; Gu=Gd×C.

In the subsequent step S53, subsequent to outputting the bulk-up deceleration Gu to power train controller 14, the bulk-up deceleration calculating process ends. The process in this step S53 corresponds to the "deceleration control unit".

Figure 12:
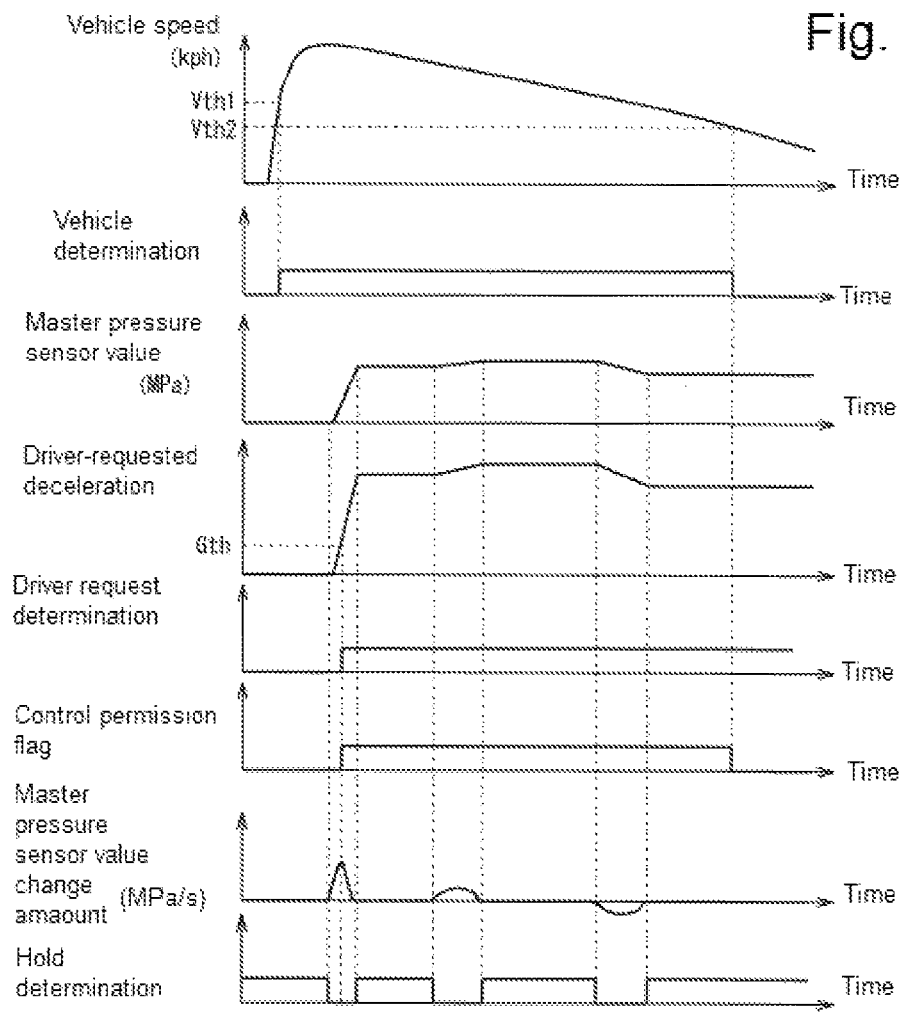
FIG. 12 is a time chart of the control permission flag and the hold determination flag.

FIG. 12 is a time chart showing a control permission flag and the hold determination flag. First, when the vehicle speed V is equal to or greater than the threshold value Vt1 (40 km/h, for example), the vehicle speed determination flag fv is set to "1". Then, based on the master cylinder pressure sensor value, the driver-requested deceleration is calculated from various factors or specifications associated with friction brake or the like, and when the driver-requested deceleration exceeds the threshold value G0 (0.05 G, for example), the deceleration request determination flag fd is set to "1".

When the vehicle speed determination flag fv is "1" and the deceleration request determination flag fd is "1", the flag fc for allowing a rise-up and build-up for increasing the deceleration by engine brake is set to "1" (step S11). In other words, when the vehicle travels at a certain vehicle speed while the driver requests a deceleration, the rise-up and build-up may be executed.

On the other hand, by observing the amount of change in the master pressure sensor value, when the change value |ΔP| is below a predetermined threshold Pt, the hold determination flag fh is set to "1" (step S12).

When control permission flag fc is "1", and the hold determination flag fh is "1", the bulk-up of deceleration by engine brake is started. More specifically, in a state in which the vehicle is traveling at speed to some extent, in response to inter-vehicle distance between the preceding vehicle becoming shorter, or the stop line is being approached, when the driver depresses on the acceleration pedal and hold or maintains at the certain degree of depression, then the deceleration control by engine brake will be started.

Depending on the driver-requested deceleration Gd, both the rise-up rate Rr and build-up rate Rb are set (step S13, FIG. 8). The rise-up rate is greater than the build-up rate, and, as the driver-requested deceleration increases, the rise-up rate Rr increases while the build-up rate Rb decreases.

Thus, since at the initial stage of driver's brake operation, the increase or growth rate becomes high, and exhibits a lower increase from mid- to later stage, the biting performance at the initial stage of brake operation is good, while the control conveys to the driver a sense of security while giving no feel of discomfort due to the gradual increase in deceleration.

Further, the amount of change (gradient or slope) in the rise-up rate with respect to the amount of change in driver-requested deceleration is larger than the amount of change (gradient or slope) in the build-up rate with respect to the amount of change in driver-requested deceleration.

Thus, as the braking force of the driver is larger, the greater the biting engagement in the initial stage of braking, thereby a sense of security is given to the driver.

An upper limit is also posed on the rise-up rate Rr. Thus, it is possible to suppress application of excessive engine brake, and an increase in engine noise is suppressed. When both the rise-up rate Rr and build-up rate Rr have been set, then rise-up rate cumulative value Cr is calculated (step S14).

Specifically, when control permission flag fc is "1", and hold determination flag fh is "1", i.e., the judgments in steps S31, S32 are both "YES", then by incrementing or accumulating at every calculation period by Rr, the rise-up rate cumulative value Cr is calculated (step S35). On the other hand, when the hold determination flag fh is "0", i.e., the judgment in step S33 is "NO", accumulation of the rise-up rate is tentatively stopped, and the previous value of rise-up rate cumulative value Cr(n−1) is retained (step S34).

Figure 13:
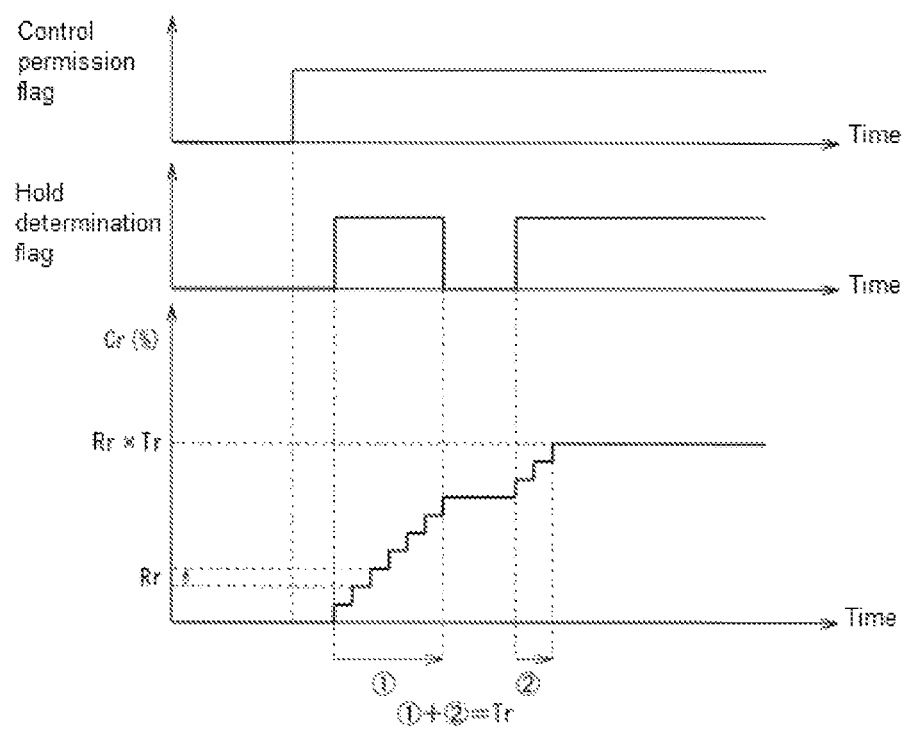
FIG. 13 is a time chart of the rise-up rate cumulative value.

FIG. 13 is a time chart of the rise-up rate cumulative value. In the rise-up rate accumulating process, during a state in which the driver is pressing on brake pedal, the previous value for the rise-up rate cumulative value Cr is retained, and only when the drive holds the brake pedal while pressing on, the rise-up rate will be accumulated.

The rise-up cumulative value Cr is restricted by the maximum value (Rr×Tr). Tr denotes a rise-up time, and represents a maximum time during which accumulation or increment by Rr is possible every calculation period. Thus, the rise-up cumulative value Cr will be prevented from being excessively accumulated. Therefore, excessive engine breaking is avoided from being applied so that an increase in engine noise may be suppressed.

Once the rise-up rate cumulative value Cr has been calculated, the build-up rate cumulative value Cb is calculated (step S15).

More specifically, when control permission or enabling flag fc is set "1" and rise-up has been completed, and hold determination flag fh is "1!, (i.e., all the judgments in steps S41, S42, and S44 turn out to be "YES"), by accumulating by Rb at every calculation period, the build-up rate cumulative value Cb is calculated (step S46). On the other hand, unless the rise-up has been completed (i.e., judgment in step S43 is "NO"), the rise-up rate cumulative value Cb is set to "0" (step S42). In addition, when hold determination flag fh is "0", (i.e., judgment in step S44 is "NO"), then the accumulation of build-up rate will be temporarily stopped, with holding the previous value of build-up rate cumulative value Cb(n−1).

Figure 14:
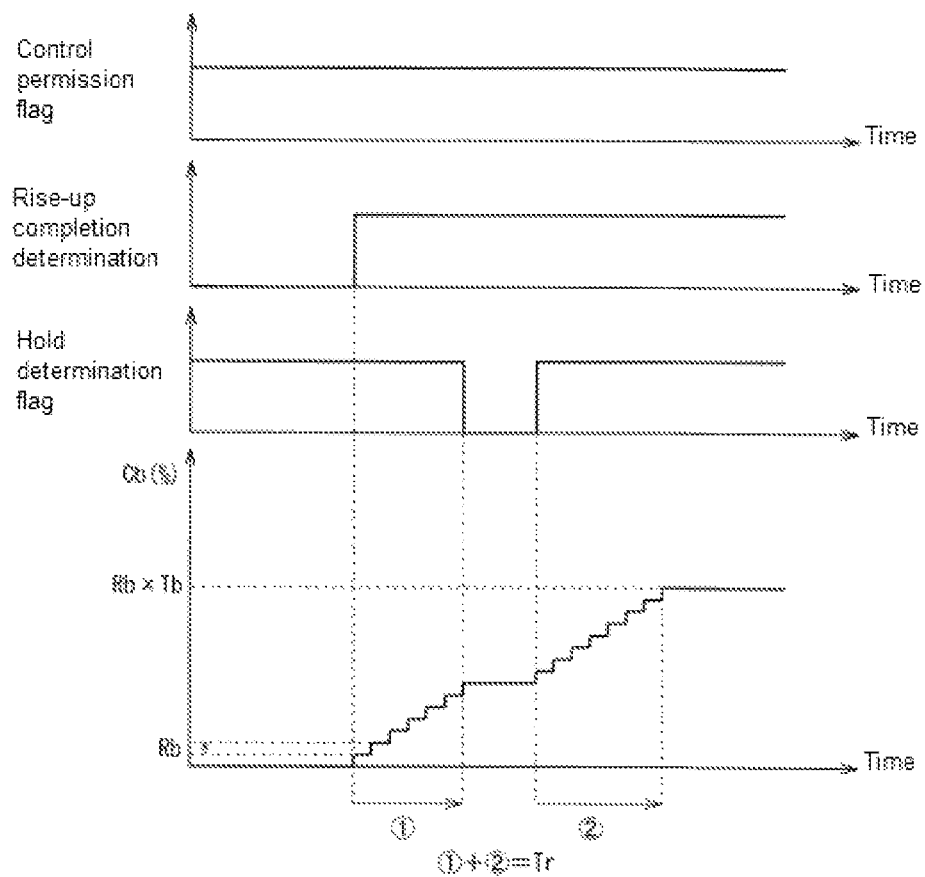
FIG. 14 is a time chart of the build-up rate cumulative value.

FIG. 14 is a time chart of the build-up rate cumulative value. In the build-up rate accumulating processing, even if rise-up has been completed, when the driver is in the process of depressing the brake pedal, the previous one of the build-up rate cumulative value Cb is retained, and only when the driver holds the brake pedal in the depressed state, build-up rate cumulative value will be accumulated or incremented.

The build-up cumulative value Cb is limited by the maximum value (Rb×Tb). Tb denotes the build-up time and represents a maximum time period during which accumulation is carried out by Rb at every calculation period. Thus, the build-up cumulative value Cb will be prevented from excessively increased.

Thus, once the build-up cumulative value Cb has been calculated, by adding the rise-up rate cumulative value Cr and build-up rate cumulative value Cb, a final bulk-up rate cumulative value C is obtained (step S51). Further, by multiplying this bulk-up cumulative value by the driver-requested deceleration Gd, the bulk-up deceleration Gu is calculated for output (step S52, 53).

Figure 15:
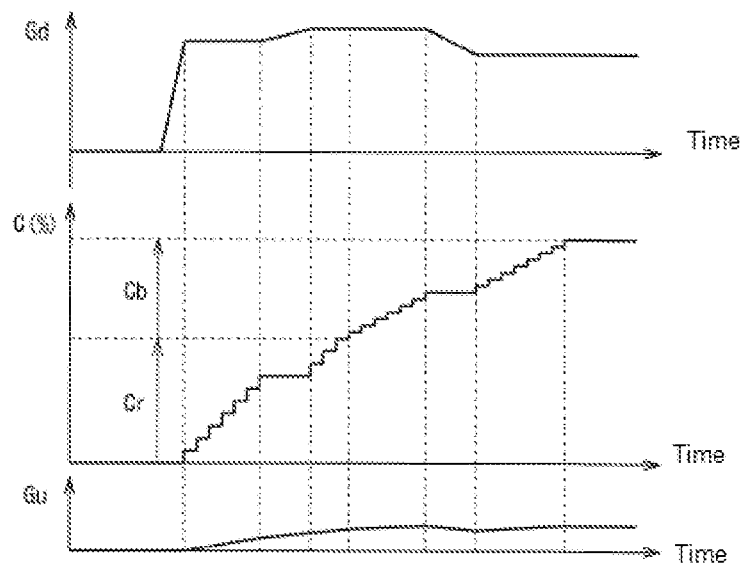
FIG. 15 is a time chart of the total boost or bulk-up cumulative value.

FIG. 15 is a time chart of the bulk-up cumulative value.

During rise-up, the rise-up rate cumulative value Cr increases while the build-up rate cumulative value maintains "0". Conversely, during the period of build-up which is initiated upon completion of the rise-up process, the build-up rate cumulative value Cb increases and the rise-up cumulative value Cr holds "0".

As described above when provided with engine brake to provide deceleration to the vehicle in a state in which the driving source is driven by the driven side, and the driver holds the operative amount of brake, the deceleration by engine brake will be increased at a rise-up rate Rr. Further, when a predetermined time has elapsed since the deceleration is increased by the rise-up rate Rr, then the deceleration at this time will further increased at a build-up rate which is set smaller than the rise-up rate. In addition, when the driver is in the process of increasing or decreasing the brake pedal, i.e., when the driver does not hold the operative amount on the brake pedal, then the deceleration by brake pedal will be maintained.

Stated another way, the deceleration is increased at the rise-up rate first when the driver is holding the brake operation amount, so that the driver may realize a good brake feel or effectiveness (biting performance).

Subsequently, since the deceleration is increased at a build-up rate Rb smaller than the rise-up rate Rr, the braking force gradually increases across the mid- and final stage of brake operation. Thus, as the vehicle approaches a preceding vehicle or the stop line, the driver is relieved and further depression of the brake pedal may be suppressed.

In this way, the driver's brake operation will be able to be assisted and the burden of operation may be lessened.

In addition, in a hydraulic friction brake mechanism generating a braking force to the wheels, according to the driver's brake operation, the normal braking force is generated. Therefore, even if, at the driver being at increasing or decreasing the amount of brake operation, either the rise-up or build-up is tentatively paused and the deceleration by engine brake is stripped, the brake force may be changed in response to the driver's operation on brake, the deceleration of the vehicle is thus kept under control. Therefore, since operability is secured, this control does not cause the driver to feel uncomfortable.

In the present embodiment, when the driver holds the brake operation, the hold determination flag fh is set to "1". This is not necessarily intended to refer to the state in which the brake operation of the driver does not change at all in a strict sense. Rather, this allows for a slight change or variation to the extent in which the driver is determined to hold or maintain the brake operation. That is, it is intended to determine that the driver holds the brake operation when the absolute value of change amount ΔP of the master pressure sensor value is less than the threshold Pt.

In the present embodiment, when the driver holds the brake operation and the deceleration due to engine brake is increased at the rise-up rate Rr for a predetermined time, the deceleration will be increased due to engine brake at a build-up rate Rb following that time. This does not necessarily make a specific reference to the situation in which, when starting to increase the deceleration at build-up rate Rb upon completion of increase due to rise-up rate, the build-up operation has to be carried out from the deceleration at the exact timing of rise-up completion. In short, since it is enough to ensure a smooth transition to the build-up from the rise up, and the driver does not experience a sense of discomfort. Therefore, the timing of deceleration at completion of rise-up operation and that at the start of build-up operation may differ as long as no discomfort will be imposed on the driver.

In this embodiment, the vehicle with engine has been described. However, of course, the invention may be applied to electric vehicles (EV) and the hybrid vehicle (HEV). That is, the invention can be applied to the system in which deceleration effect is obtainable in the state in which the vehicle driving power source for propulsion is driven by the driven side.

Thus, in sum, the deceleration control unit 100, bulk-up deceleration calculating unit 27, and the process in step S16, or step S53 in particular, correspond to the "deceleration control unit". Further, the first increase control unit 101, rise-up cumulative unit 24, and the process in step S14 corresponds to the "first increase control unit", whereas the second increase control unit 102, build-up cumulative unit 25, and the process in step S15 correspond to the "second increase control unit". Further, the process in the step S35 corresponds to the "first ending control unit", and the process in step S46 corresponds to the "second ending control unit". The processes in step S34, S45 correspond to "hold control unit". In addition, the process in step S26 corresponds to "increase rate setting unit", and driver-requested deceleration calculating unit 31 corresponds to the "requested deceleration calculating unit". The wheel speed sensors 11FL to 11RR and vehicle speed calculating unit correspond to the "vehicle speed detection unit".

(1) According to the vehicle deceleration control device in the present embodiment, engine brake is provided to impart deceleration to the vehicle by having the vehicle drive or propulsion source to be driven from the driven side, and, when the driver holds the brake operation amount, the deceleration by the engine brake will be increased at rise-up rate Rr. Further, when the driver holds the brake operation and the deceleration by engine brake at a rise-up rate Rr has increased for a predetermined time, the deceleration at this time will be further increased at a build-up rate Rb that is less than the rise-up rate Rr. Note that the deceleration by engine brake will be sustained when the driver is in decreasing or increasing the brake pedal operation value.

In this manner, when the driver maintains or holds the brake operation, since the deceleration is firstly increased at a rise-up rate Rr, at the initial stage of brake operation, the driver may feel effectiveness of brake (biting engagement). Subsequently, since the deceleration is increased at a build-up rate Rb less than the rise-up rate, braking force gradually increases from the mid- to final stage of the brake operation. Therefore, as the vehicle approaches the preceding vehicle or the stop line, the driver would not be required to take a corrective action by way of further depression, so that the tendency to depress the brake pedal further may be suppressed and operative burden of the driver will be lessened.

(2) According to the vehicle deceleration control device in the present embodiment, when increasing or decreasing the brake operative amount, then deceleration caused by engine brake is maintained.

As a result, the driver may control the deceleration of the vehicle. In other words, because the operability is ensured, the driver would not feel uncomfortable.

(3) According to the vehicle deceleration control device according to the present embodiment, in accordance with the amount of driver's brake operation, the rise-up ratio Rr and build-up ratio Rb are set in such a way that, as the driver's brake operation increases, the rise-up rate Rr will increase while decreasing the build-up rate Rb.

Thus, since the increase rate is high at the initial state of brake operation, and the increase rate becomes low from the mid- to final stage, biting engagement at the initial stage of brake depression is good, and, because of decrease in the increase rate for the mid- to final stage, the driver would not feel discomfort and is given a sense of security.

(4) According to the vehicle deceleration control device of the present embodiment, the change amount of rise-up rate Rr with respect to the change amount of brake operative amount by the driver is set greater than the change amount of the build-up rate Rb with respect to the change amount of brake operation amount by the driver.

(5) According to the vehicle deceleration control in the present embodiment, the deceleration caused by engine brake is increased at a rise-up rate Rr, and when a predetermined time has passed, the deceleration at this point of time is maintained and increase in deceleration by engine brake is terminated.

Thus, the deceleration may be prevented from increasing unnecessarily. Therefore, since the excessive deceleration may be prevented and reduction sounds of the power source is prevented from increasing (6) According to the vehicle deceleration control of the present embodiment, following the increase in deceleration caused by engine brake at build-up rate Rb for a predetermined period of time, the deceleration at this point in time is maintained, and the increase in deceleration by engine brake is terminated.

Thus, deceleration may be prevented from being increased unnecessarily. Therefore, since the excessive deceleration is prevented from occurring, the reduction noise of the power or driving source may be suppressed from increasing.

(7) According to the vehicle deceleration control apparatus of the present embodiment, the rise-up rate Rr is restricted by an upper limit.

Thus, the deceleration is prevented from being increased unnecessarily. Therefore, since excessive deceleration may be prevented from generating, the reduction drive source noise is suppressed.

(8) According to the vehicle deceleration control device of this embodiment, the requested deceleration Gd is calculated in accordance with the brake operative amount of the driver. In addition, vehicle speed V is detected. During rise-up, when the requested deceleration Gd is greater than a predetermined value, vehicle speed V is greater than the predetermined threshold, the driver holds the brake operation amount, and the deceleration by engine brake has been increased at a rise-up rate Rr for a predetermined time, the deceleration by engine brake is increased at a build-up rate Rb smaller than the rise-up rate.

In this way, by taking into account the requested deceleration and vehicle speed and, a deceleration intention of the driver may be reliably detected so that the deceleration control is performed in line with the driver's decelerating intention.

(9) According to the method for vehicle deceleration control of the present embodiment, an engine brake is provided to impart deceleration to the vehicle by having the vehicle drive or propulsion source to be driven from the driven side, and, when the driver holds the brake operation amount, the deceleration caused by engine brake will be increased at rise-up rate Rr. Further, when the driver holds the brake operation and increase the deceleration by engine brake at a rise-up rate Rr for a predetermined time, the deceleration at this time will be further increased a build-up rate Rb that is smaller than the rise-up rate Rr.

In this manner, when the driver maintains or holds the brake operation, since the deceleration is firstly increased at a rise-up rate Rr, at the initial stage of brake operation, the driver may feel effectiveness of brake (biting engagement). Subsequently, since the deceleration is increased at a build-up rate Rb less than the rise-up rate, braking force gradually increases from the mid- to final stage of the brake operation. Therefore, as the vehicle approaches the preceding vehicle or the stop line, the driver would not be required to take a corrective action by way of further depression, so that the tendency to depress the brake pedal further may be suppressed and operative burden of the driver will be lessened.

In the present embodiment, the deceleration by engine brake is limited by an upper limit GLIM or below. Except for this point, the first embodiment described above is equally applicable so that the detailed description of the same parts is omitted.

First, description is made of the deceleration control processing executed by the vehicle control controller 13.

Figure 16:
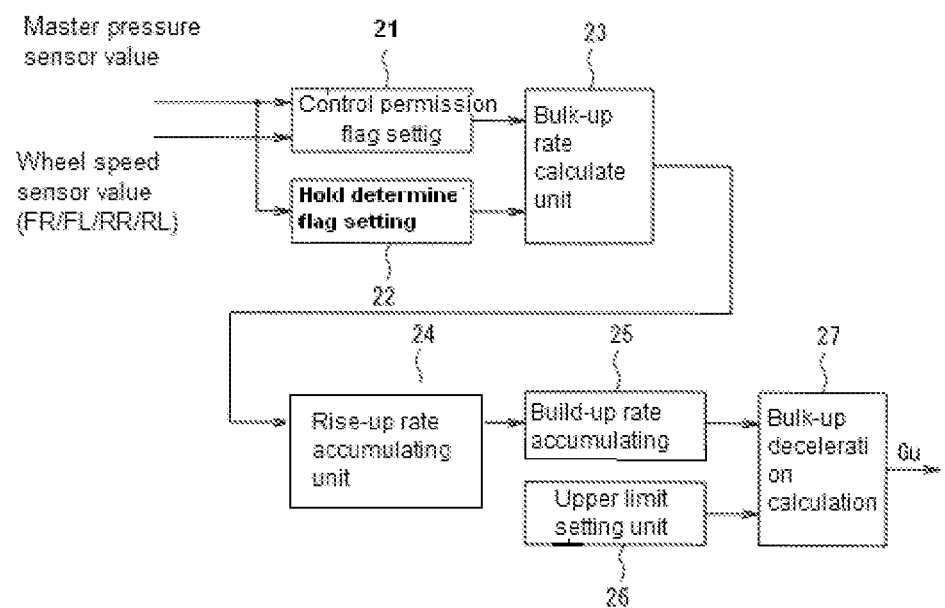
FIG. 16 is a block diagram showing a deceleration control process in the second embodiment.

FIG. 16 is a block diagram showing a deceleration control process of the second embodiment. The control permission flag setting unit 21, through CAN and the like, determines on the execution or non-execution of deceleration boost or bulk-up operation based on the master cylinder sensor pressure detecting the driver's operation, wheel speed sensor detecting the status of wheels, and sets a control permission flag fc.

Based on the master pressure sensor value, the hold determination flag setting unit 22 determines whether or not the driver is holding a brake operation, and sets the holding determination flag fh.

The boost or bulk-up rate calculating unit 23 calculates a driver-requested deceleration Gd based on the master pressure sensor value, and, based on the control permission flag fc, hold determination flag fh, and driver-requested deceleration Gd, calculates a rise-up rate Rr at the time of launch (rising up) of engine brake as well as a build-up rate Rb at the time of further increase (build-up) following the launch of the engine brake.

The rise-up rate accumulation unit 24 calculates the cumulative value of rise-up rates based on the control permission flag fc, hold determination flag fh, and the rise-up rate Rr. This rise-up rate cumulative unit 24 corresponds to the "first increase to the "first increase control unit".

The build-up rate accumulation unit 25 calculates a cumulative value Cb of the build-up rate based on the control permission flag fc, hold determination flag fh, and build-up rate Rb. This build-up rate accumulate unit 25 corresponds to the "second increase control unit".

The upper limit setting unit 26 sets an upper limit GLIM with respect to the bulk-up deceleration Gu. This upper limit setting unit 26 corresponds to the "limiting unit".

The bulk-up deceleration calculating unit 27 calculates the bulk-up deceleration Gu based on the rise-up rate cumulative value Cr, build-up rate cumulative value Cb, and driver-requested deceleration Gd. The calculated bulk-up deceleration Gu is sent through CAN or the like to the power train controller. This bulk-up deceleration calculating unit 27 corresponds to the "deceleration control unit".

Figure 17:
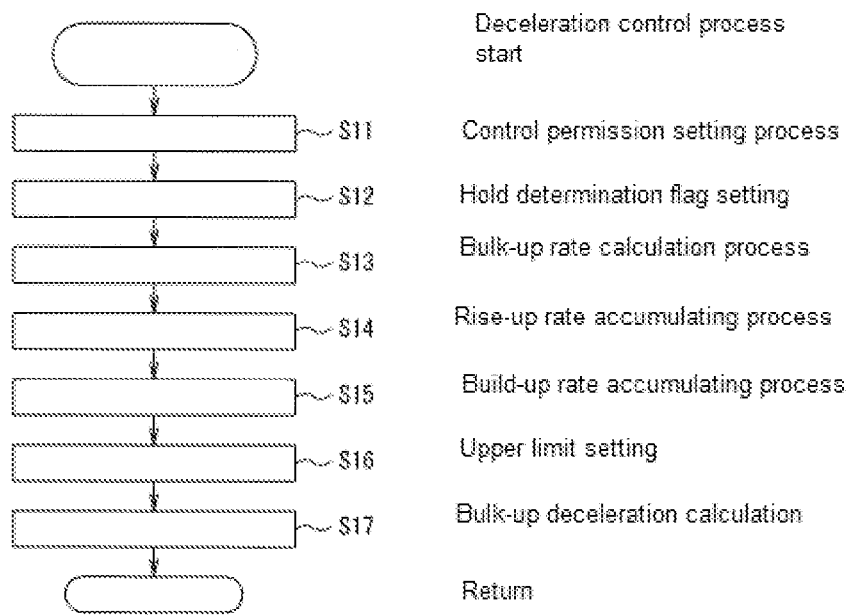
FIG. 17 is a flowchart showing deceleration control process in the second embodiment.

FIG. 17 is a flowchart showing deceleration control process in the second embodiment. This deceleration control process is performed at each a predetermined time (every 10 msec, for example).

First, in step S11, the control permission flag setting process is executed to be described later, on the basis of the master pressure sensor value, the wheel speed sensor value to determine the necessity of bulk-up deceleration control and sets the control permission flag fc.

In the subsequent step S12, the hold determination flag setting process is executed on the basis of the master pressure sensor value, to determine whether or not the driver is holding the brake operation, and sets the holding determination flag fh. In the subsequent step S13, the bulk-up rate calculation process is executed, and calculates a driver-requested deceleration based on the master pressure sensor value, and, based on the control permission flag, hold determination flag, and driver-requested deceleration, both the rise-up rate and build-up rate are calculated.

In the subsequent step S14, the rise-up rate accumulating process is executed, and, based on the control permission flag, hold determination flag, and rise-up rate, the raise-up cumulative amount is calculated. This process in step S14 corresponds to the "second increase control unit."

In the subsequent step S15, the build-up rate accumulating process is executed, and, based on the control permission flag, hold determination flag, and rise-up rate, the raise-up cumulative amount is calculated. This process in step S15 corresponds to the "second increase control unit."

In the following step S16, an upper limit setting process is carried out, and an upper limit GLIM is set with respect to the bulk-up deceleration Gu.

In the subsequent step S17, the bulk-up deceleration calculation process to be described later is executed, and based on the rise-up rate cumulative value, build-up rate cumulative value, and the driver-requested deceleration, the bulk-up deceleration is calculated and sent to power train controller 14. The process in this step S17 corresponds to the "deceleration control unit".

Now, description is made of the upper limit setting process. In this embodiment, with reference to map, the upper limit GLIM is set in accordance with vehicle speed.

Figure 18:
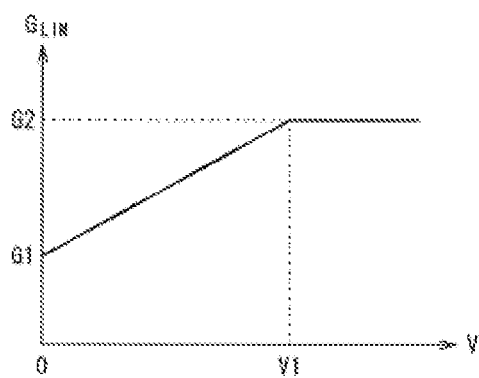
FIG. 18 is a map used to set the upper limit value GLIM.

FIG. 18 is a map for setting the upper limit GLIM. According to this map, as the vehicle speed V increases, the upper limit GLIM also increases. More specifically, when the vehicle speed changes from "0" to a predetermined value V1, the upper limit GLIM increases from a set value G1 larger than "zero" to set value G2. Further, when the vehicle speed V exceeds the set value V1, the upper limit GLIM maintains the set value. The set value V1 corresponds to the vehicle speed at which road noise and wind noise become small.

Now, description is made of bulk-up deceleration calculating process.

Figure 19:
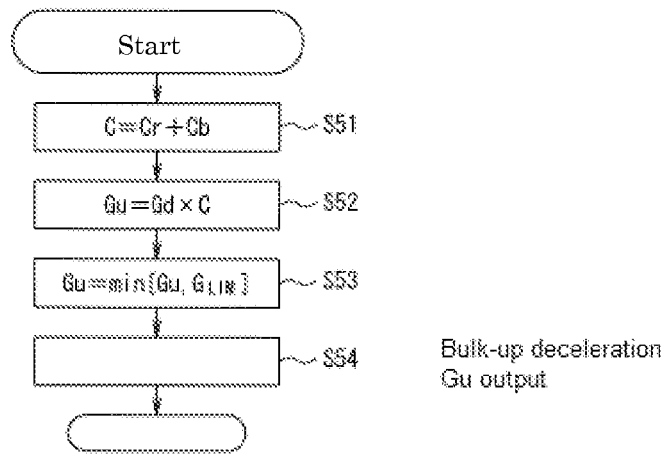
FIG. 19 is a flow chart showing a process of calculating a boost or bulk-up deceleration in the second embodiment.

FIG. 19 is a flowchart showing a process of calculating a bulk-up deceleration in the second embodiment. In step S51, first, as shown below, by adding the rise-up rate cumulative value Cr to the build-up rate cumulative value Cb to calculate a bulk-up rate cumulative value C; C=Cr+Cb.

In the subsequent step S52, as shown below, by multiplying the bulk-up cumulative value C and driver-requested deceleration Gd to obtain the bulk-up deceleration Gu; Gu=Gd×C.

In the subsequent step S53, as described below, a smaller value of the bulk-up deceleration Gu and the upper limit GLIM is set as a final bulk-up acceleration (select lower one). The process in step S53 corresponds to the "restriction unit". Gu=min [Gu, GLIM]

In the subsequent step S54, after outputting the bulk-up deceleration Gu to power train controller 14, process terminates this bulk-up deceleration. The process in this step S54 corresponds to part of the "deceleration control unit".

First, when the vehicle speed V is equal to or greater than the threshold value Vt1 (40 km/h, for example), the vehicle speed determination flag fv is set to "1". Then, based on the master cylinder pressure sensor value, the driver-requested deceleration is calculated from various factors or specifications associated with friction brake or the like, and when the driver-requested deceleration exceeds the threshold value G0 (0.05 G, for example), the deceleration request determination flag fd is set to "1".

When the vehicle speed determination flag fv is "1" and the deceleration request determination flag fd is "1", the flag fc for allowing a rise-up and build-up for increasing the deceleration by engine brake is set to "1" (step S11). In other words, when the vehicle travels at a certain vehicle speed while the driver requests a deceleration, the rise-up and build-up in the present embodiment are executed.

On the other hand, by observing the amount of change in the master pressure sensor value, when the change value |ΔP| is below a predetermined threshold Pt, the hold determination flag fh is set to "1" (step S12).

When control permission flag fc is "1", and the hold determination flag fh is "1", the bulk-up of deceleration by engine brake is started. More specifically, in a state in which the vehicle is traveling at speed to certain extent, in response to inter-vehicle distance between the preceding vehicle becoming shorter, or the stop line is being approached, when the driver depresses on the acceleration pedal and holds or maintains at the certain degree of depression, then the deceleration control by engine brake is started.

Depending on the driver-requested deceleration Gd, both the rise-up rate Rr and build-up rate Rb are set (step S13, FIG. 8). The rise-up rate is greater than the build-up rate, and, as the driver-requested deceleration increases, the rise-up rate Rr increases while the build-up rate Rb decreases.

Thus, since at the initial stage of driver's brake operation, the increase or growth rate becomes high, and exhibits a lower increase from mid- to later stage, the biting performance at the initial stage of brake operation is good, while the control conveys to the driver a sense of security while giving no feel of discomfort due to the gradual increase in deceleration from mid to final stage.

Further, the change amount (gradient or slope) in the rise-up rate with respect to the amount of change in driver-requested deceleration is larger than the change amount (gradient or slope) in the build-up rate with respect to the amount of change in driver-requested deceleration.

Thus, as the braking force of the driver is larger, the greater the biting engagement in the initial stage of braking, thereby a sense of security is given to the driver.

An upper limit is also posed on the rise-up rate Rr. Thus, it is possible to suppress excessive engine brake being applied, and increase in engine noise is suppressed. When both the rise-up rate Rr and build-up rate Rr have been set, then rise-up rate cumulative value Cr is calculated (step S14).

Specifically, when control permission flag fc is "1", and hold determination flag fh is "1", i.e., the judgments in steps S31, S32 are both "YES", then by incrementing or accumulating at every calculation period by Rr, the rise-up rate cumulative value Cr is calculated (step S35). On the other hand, when the hold determination flag fh is "0", i.e., the judgment in step S33 is "NO", accumulation of the rise-up rate is tentatively stopped, and the previous value of rise-up rate cumulative value Cr(n−1) is retained (step S34).

In the rise-up rate accumulating process, during a state in which the driver is pressing on brake pedal, the previous value for the rise-up rate cumulative value Cr is retained, and only when the drive holds the brake pedal with the pedal depressed, the rise-up rate will be accumulated.

The rise-up cumulative value Cr is restricted by the maximum value (Rr×Tr). Tr denotes a rise-up time, and represents a maximum time during which accumulation or increment by Rr is possible every calculation period or cycle. Thus, the rise-up cumulative value Cr will be prevented from being excessively accumulated. Therefore, excessive engine break is avoided from being applied so that an increase in engine noise may be suppressed Once the rise-up rate cumulative value Cr has been calculated, the build-up rate cumulative value Cb is calculated (step S15). More specifically, when control permission or enabling flag fc is set "1" and rise-up has been completed, and hold determination flag fh is "1", (i.e., all the judgments in steps S41, S42, and S44 turn out to be "YES"), by accumulating by Rb at every calculation period, the build-up rate cumulative value Cb is calculated (step S46). On the other hand, unless the rise-up has been completed (i.e., judgment in step S43 is "NO"), the rise-up rate cumulative value Cb is set to "0" (step S42). In addition, when hold determination flag fh is "0", (i.e., judgment in step S44 is "NO"), then the accumulation of build-up rate will be temporarily stopped, with holding the previous value of build-up rate cumulative value Cb (n−1).

In the build-up rate accumulating process, even if rise-up has been completed, when the driver is in the process of depressing the brake pedal, the previous one of the build-up rate cumulative value Cb is retained, and only when the driver holds the brake pedal in the depressed state, build-up rate cumulative value will be accumulated or incremented.

The build-up cumulative value Cb is limited by the maximum value (Rb×Tb). Tb denotes the build-up time and represents a maximum time period during which accumulation is carried out by Rb at every calculation period. Thus, the build-up cumulative value Cb will be prevented from excessively increased.

Thus, once the build-up rate cumulative value Cb has been calculated, the upper limit value GLIM is set (step S16). More specifically, as the vehicle speed V is lower than the set value V1, the upper limit GLIM is made smaller. Stated otherwise, as the vehicle speed decreases, the background noise such as road noise or wind noise is reduced so that engine sound will be instead conspicuous. Therefore, by setting the upper limit value GLIM smaller in accordance with decrease in vehicle speed, the engine noise (deceleration noise) may be suppressed from further rising.

When the upper limit GLIM has been set in this manner, by adding the rise-up cumulative value Cr and build-up cumulative value Cb, a final bulk-up rate cumulative value C is calculated (step S51). Subsequently, by multiplying this bulk-up cumulative value C by the driver-requested deceleration Gd, the bulk-up deceleration Gu is calculated (step S52).

Then, out of the bulk-up deceleration Gu and upper limit value GLIM, the smaller one is set as a final bulk-up deceleration Gu for output (steps S53, S54). By limiting the bulk-up deceleration Gu calculated in accordance with bulk-up cumulative value C and driver-requested deceleration Gd by the upper limit value GLIM, the rise of engine noise (deceleration noise) may be suppressed.

During rise-up, the rise-up rate cumulative value Cr increases while the build-up rate cumulative value maintains "0". Conversely, during the period of build-up which is initiated upon completion of the rise-up process, the build-up rate cumulative value Cb increases and the rise-up cumulative value Cr holds "0".

The maximum value of bulk-up rate cumulative value C is obtained by adding the maximum value of rise-up rate cumulative value (Rr×Tr) and the maximum value of build-up rate cumulative value (Rb×Tb).

As described above when deceleration is imparted to vehicle with engine brake in the state in which the driving or power source is driven by the driven side, and the driver holds the operation amount of brake, the deceleration caused by engine brake will be increased at a rise-up rate Rr. Further, when a predetermined time has elapsed since the deceleration is increased by the rise-up rate Rr, then the deceleration at this time will further increased at a build-up rate which is set smaller than the rise-up rate. In addition, when the driver is in the process of increasing or decreasing the brake pedal, i.e., when the driver does not hold the operation amount on the brake pedal, then the deceleration by brake pedal will be maintained.

Stated another way, the deceleration is increased at the rise-up rate first when the driver is holding the brake operation amount, so that the driver may realize a good brake feel or effectiveness (biting performance).

Subsequently, since the deceleration is increased at a build-up rate Rb less than the rise-up rate Rr, the braking force gradually increases across the mid- and final state of brake operation. Thus when the vehicle approaches a preceding vehicle or the stop line, the progressive depression on brake pedal of the driver and the increase of corrective operation may be suppressed.

In this way, the driver's brake operation will be able to be assisted and the burden of operation may thus be lessened. In addition, in a hydraulic friction brake mechanism generating a braking force to the wheels, according to the driver's brake operation, the normal braking force is generated. Therefore, even if, at the driver being increasing or decreasing the amount of brake operation, either the rise-up or build-up is tentatively paused and the deceleration by engine brake is held or maintained, the brake force may vary in response to the driver's operation on brake, the deceleration of the vehicle is kept under control. Thus, since operability is secured, this control does not cause the driver to feel uncomfortable.

Thus, summing up, the bulk-up deceleration calculating unit 27, and the process in step S17, or step S54 in particular, correspond to the "deceleration control unit". Further, the rise-up rate cumulative unit 24, and the process in step S14 corresponds to the "first increase control unit", whereas the build-up rate cumulative unit 25, and the process in step S15 correspond to the "second increase control unit". Further, the upper limit value setting unit 26 and the process in step D53 in particular in step S16 corresponds to the "restriction unit".

(1) According to the vehicle deceleration control device in the present embodiment, an engine brake is provided to impart deceleration to the vehicle by having the vehicle power or propulsion source to be driven from the driven side, and, when the driver holds the brake operation amount, the deceleration by engine brake will be increased at rise-up rate Rr. Further, when the driver holds the brake operation and has increased the deceleration by engine brake at a rise-up rate Rr for a predetermined time, the deceleration at this time will be further increased at a build-up rate Rb that is less than the rise-up rate Rr. Note that the deceleration by engine brake will be sustained when the driver is decreasing or increasing the brake pedal. Moreover, the deceleration caused by engine brake is limited below an upper limit value GLIM.

In this manner, when the driver maintains or holds the brake operation, since the deceleration is firstly increased at a rise-up rate Rr, at the initial stage of brake operation, the driver may feel effectiveness of brake (biting engagement). Subsequently, since the deceleration is increased at a build-up rate Rb less than the rise-up rate, braking force gradually increases from the mid- to final stage of the brake operation. Therefore, as the vehicle approaches the preceding vehicle or the stop line, the driver would not be required to take a corrective action by way of further depression, so that the tendency to depress the brake pedal further may be suppressed and operative burden of the driver will be lessened.

Moreover, by limiting the deceleration caused by engine brake below the upper limit GLIM, excessive deceleration may be prevented from occurring. Thus, the brake operation of the driver is assisted, and the operative burden is subject to reduction.

(2) According to the vehicle deceleration control device, as the vehicle speed V lowers, the upper limit value GLIM is made lower. Thus, by having a smaller upper limit value GLIM as the vehicle speed lowers, the rise of engine noise (deceleration noise) may be suppressed.

(3) According to the method for vehicle deceleration control of the present embodiment, the operation in which deceleration to the vehicle is imparted by having the vehicle drive or propulsion source to be driven from the driven side is referred to as engine brake (power source deceleration). When the driver holds the brake operation amount, the deceleration caused by engine brake will be increased at a rise-up rate Rr. Further, when the driver holds the brake operation and increase the deceleration by engine brake at a rise-up rate Rr for a predetermined time, the deceleration at this time will be further increased at a build-up rate Rb that is smaller than the rise-up rate Rr. Moreover, when the driver is decreasing or increasing the brake pedal operation amount, then the deceleration caused by engine brake is maintained. In addition, the deceleration by engine brake is limited below the upper limit GLIM.

In this manner, when the driver maintains or holds the brake operation, since the deceleration is firstly increased at a rise-up rate Rr, at the initial stage of brake operation, the driver may feel effectiveness of brake (biting engagement). Subsequently, since the deceleration is increased at a build-up rate Rb less than the rise-up rate, braking force gradually increases from the mid- to final stage of the brake operation. Therefore, as the vehicle approaches the preceding vehicle or the stop line, the driver would not be required to take a corrective action by way of further depression, so that the tendency to depress the brake pedal further may be suppressed and operative burden of the driver will be lessened.

Moreover, by limiting the deceleration caused by engine brake lower than an upper limit GLIM, an excessive deceleration will be suppressed from generating. Therefore, the brake operation of the driver is assisted, and operative burden is lessened.

This third embodiment is intended to vary the upper limit GLIM for the bulk up deceleration Gu depending on the driving style of the driver. More specifically, the upper limit GLIM is adjusted depending on the longitudinal acceleration and lateral acceleration.

Therefore, the configuration, operation and effects in the present embodiment are the same as the second embodiment except for the upper limit value setting process, a detailed description thereof will be omitted.

Figure 20:
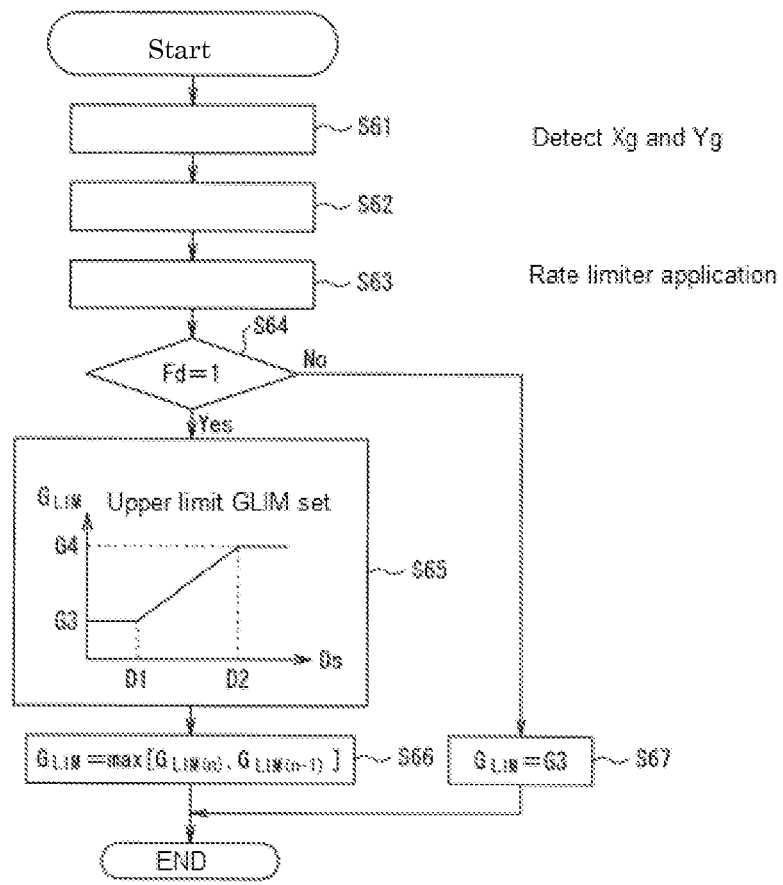
FIG. 20 is a flowchart showing the upper limit setting process in the third embodiment.

The upper limit value setting process in the present embodiment will now be described. FIG. 20 is a flowchart showing the process of setting the upper limit of the third embodiment. In step S61, the longitudinal acceleration Xg and lateral acceleration Yg are detected, respectively. In the subsequent step S62, as shown below, the square-root of sum of squares of the longitudinal acceleration Xg and lateral acceleration Yg is calculated.

$$Ds=\sqrt{(Xg^2+Yg^2)}$$

In the subsequent step S63, the processing or application of a rate limiter for the square root of sum of squares Ds is carried out. That is, the amount of change per unit time of the square-root of sum of squares Ds is limited below a predetermined set amount. In the subsequent step S64, it is determined whether or not the deceleration request determination flag fd is "1". When the determination result is that fd=1, the process proceeds to step S65. On the other hand, when the determination result is fd=0, control proceeds to step S67.

In step S65, the reference is made to the map and the upper limit GLIM is set according to the square root of the sum of squares Ds. According to this map, as the square-root of sum of squares Ds is larger, the upper limit value GLIM increases.

More specifically, when the square-root of sum of squares Ds is in the range between 0 and a predetermined set value Ds1, the upper limit GLIM maintains a set value G3 greater than 0. When the square root of sum of squares Ds increases in the range from Ds1 to Ds2, the upper limit GLIM increases in a range between a set value G3 and a set value G4, When the square-root of the sum of squares Ds is equal to or greater than Ds2, the upper limit value GLIM maintains a set value G4.

In the next step S66, as shown below, out of the current value GLIM(n) of the upper limit value GLIM and previous value GLIM(n−1), by setting a larger value as the final upper limit GLIM, this upper limit setting process ends. GLIM=max[GLIM(n), GLIM(n−1)]

In step S67, by setting the upper limit GLIM at the set value G3 described above, this upper limit value setting process ends. The processes in steps S61 to S67 correspond to a part of the "restriction unit".

In the present embodiment, a driving style is determined from the longitudinal acceleration Xg and lateral acceleration Yg, and the upper limit GLIM is set according to the driving style. In this case, the degree of sharp and sporty style is determined in which the longitudinal acceleration Xg and lateral acceleration Yg are relatively clearly reflected.

In other words, if the determination is made for the driver who prefers a sharp, sporty style, he or she tends to enjoy a certain degree of engine sound (deceleration sound). Here, the driver's driving style is estimated based on the longitudinal acceleration Xg and lateral acceleration Yg, and, when a sporty driving style is more preferred, the upper limit GLIM increases. Thus, since it is possible to set the upper limit value GLIM in accordance with the driving style, a favorable deceleration for the driver may be achieved with engine sound (sound deceleration) accordingly generated.

Figure 21:
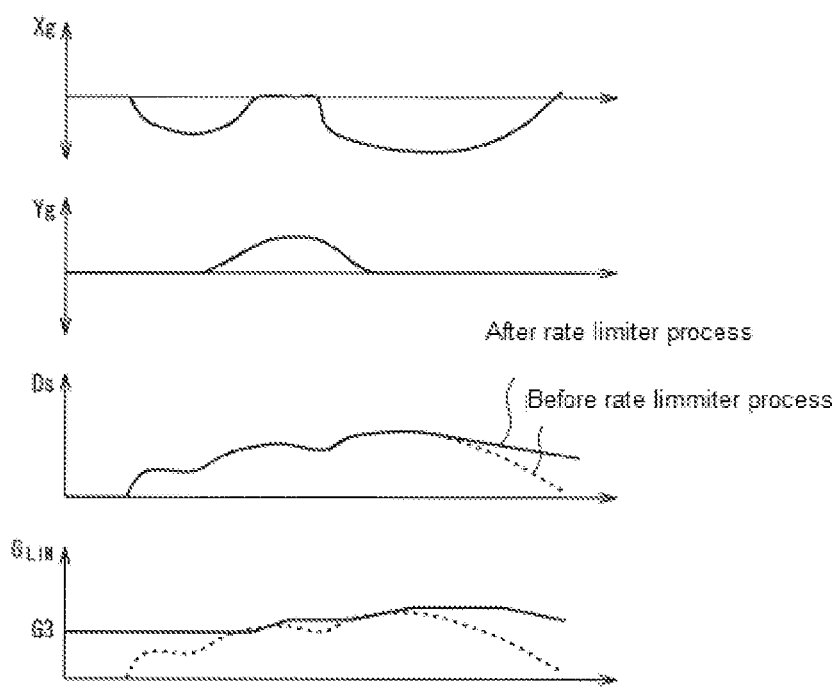
FIG. 21 is a time chart showing the set state of the upper limit value GLIM.

FIG. 21 is a time chart showing setting state of the upper limit value GLIM. First, a square-root of sum of squares of the longitudinal acceleration Xg and lateral acceleration Yg is calculated (step S61, S62), a rate limiter processing is applied thereon (step S63). Accordingly, an abrupt change of square-root of sum of squares Ds may be suppressed. Then, the upper limit value GLIM is set in accordance with the square root of the sum of squares Ds (step S65), and by doing a select-high of the upper limit GLIM and the set value G3, a final GLIM will be set (step S66).

Note that, when the deceleration request flag fd is "0", (i.e., the judgment in step S64 is "NO"), the upper limit GLIM always maintains a predetermined set value G3.

From the above, the processes in step S61 to S67 correspond to a part of the "restriction unit".

(1) According to the vehicle deceleration control device in this embodiment, as the square root sum of the squares Ds of the longitudinal acceleration Xg and lateral acceleration Yg increases, the upper limit GLIM also increases. By so doing, as the square root of sum of the squares Ds of the longitudinal acceleration Xg and lateral acceleration Yg increases, by setting the upper limit GLIM larger, engine sound (deceleration sound) may be generated to match the driving style of the driver, The fourth embodiment is intended to vary the upper limit value GLIM with respect to a bulk-up deceleration Gu.

Therefore, the configuration, operation and effects in the present embodiment are the same as the second embodiment except for the upper limit value setting process, a detailed description thereof will be omitted.

Figure 22:
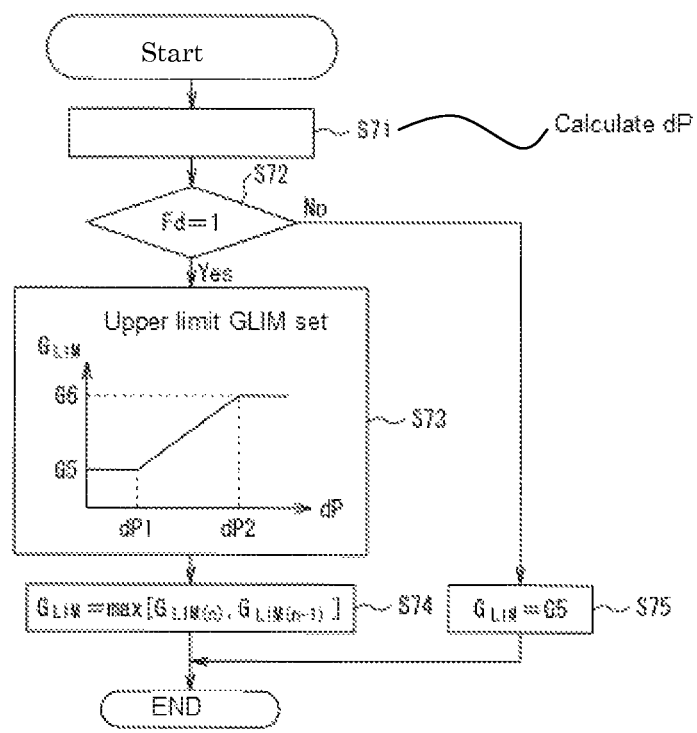
FIG. 22 is a flowchart showing the upper limit setting process in the fourth embodiment.

Description is now made of the setting process of the upper limit of the present embodiment. FIG. 22 is a flowchart showing the setting process of the upper limit in the fourth embodiment. In step S71, an increased amount of acceleration dP is calculated depending on the value of master pressure sensor. This represents an increased amount of the master pressure sensor value per unit time such as differential value and the like. In the subsequent step S72, it is determined whether or not the deceleration request determination flag fd is "1". When the determination result fd is "1", process proceeds to step S73. On the other hand, when the determination result fd is "0", control proceeds to step S75.

In step S73, the reference is made to the map, and the upper limit GLIM is set depending on the increased acceleration dP of break pressure. According to this map, as the increased acceleration dP is larger, the upper limit value GLIM increases. More specifically, when the increased acceleration dP is in the range between 0 and a predetermined set value dP1, the upper limit GLIM maintains a set value G5 greater than 0. When the increased acceleration dP increases in the range from dP1 to dP2, the upper limit GLIM increases in a range of a set value G5 and a set value G6, When the increased acceleration dP is equal to or greater than dP2, the upper limit value GLIM maintains a set value G6.

In the subsequent step S74, as shown below, out of current value GLIM(n) and the previous one GLIM (n−1) of upper limit value GLIM, by selecting the larger value to set a final upper limit GLIM, the upper limit setting process ends.

$$GLIM=\max[GLIM(n),GLIM(n-1)]$$

In step S75, after setting the G5 described above to the upper limit GLIM, the upper limit value setting process ends. The processes of step S71 to S75 above correspond to a part of the "restriction unit".

This embodiment sets the upper limit value GLIM, depending on the increase rate of the brake operation dP. In other words, it is considered that, as the depression of the brake speed is faster, the driver is hoping to more rapid deceleration. Therefore, as the increased acceleration of brake operation dP is faster, the upper limit GLIM will be increased. Thus, since it is possible to set the upper limit value GLIM in accordance with the intention of deceleration of the driver, a favorable deceleration for the driver may be achieved. On the other hand, by reducing the upper limit value GLIM when the brake is being depressed slowly, by setting the upper limit GLIM smaller, an excessive increase in deceleration may be inhibited while suppressing the engine sound (deceleration sound). From the above, the processes in steps S71 to S75 correspond to a part of "restriction unit".

According to the vehicle deceleration control apparatus of this embodiment, as the driver's brake operation speed dP is higher, the upper limit GLIM is increased. Thus, by setting the upper limit GLIM greater as the brake operation speed of the driver increases, in accordance with the deceleration intention of the driver, a favorable deceleration for the driver may be achieved.

Figure 23:
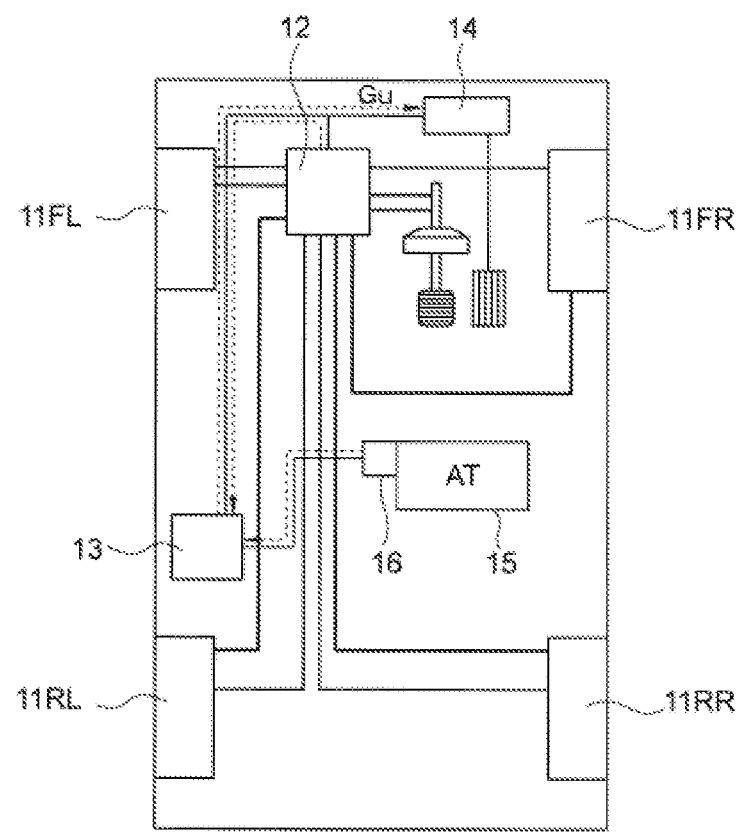
FIG. 23 is a block diagram of the deceleration control device in the fifth embodiment.

FIG. 23 is a block diagram of the deceleration control device according to the fifth embodiment. The deceleration control device is provided with wheel speed sensors 11FL to 11RR for detecting the speed of each wheel, a brake actuator 12 with a built-in master pressure sensor for detecting the brake operation of the driver, a vehicle control controller 13 for controlling the vehicle deceleration, a power train controller 14 for achieving the braking force, a transmission 15, and a shift sensor 16 for detecting a shift position of the transmission 15. Note that the shift sensor 16 corresponds to a part of the "transmission state detection unit".

Using communications such as CAN, the vehicle control controller 13 receives the wheel speed sensor value of each wheel, a master cylinder sensor value, and shift sensor value, and calculates the boost or bulk-up deceleration Gu, and transmits the command regarding the bulk-up deceleration Gu to the power train controller 14.

The power train controller 14 receives command values and executes an engine brake control. The control on engine brake may be executed by controlling the gear position or speed ratio of the transmission (CVT), for example.

Figure 24:
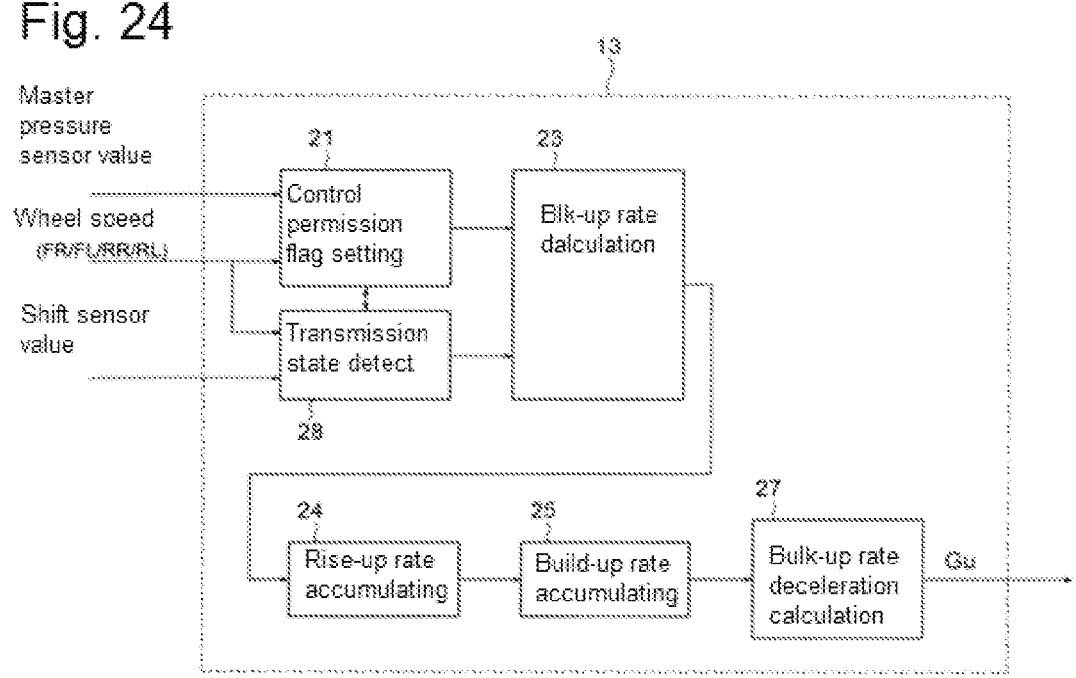
FIG. 24 is a block diagram showing a deceleration control process in the fifth embodiment.

Description of the deceleration control process to be executed by the controller 13 for vehicle control is now described. FIG. 24 is a block diagram showing a deceleration control process of the fifth embodiment. Through CAN and the like, based on a wheel speed sensor value for detecting wheel speed, shift sensor value for detecting the shift position of the transmission, the power transmission state on driven side of engine (driving or power source), i.e. from engine to a tire contact with road surface. More specifically, the power transmission state of the transmission 15 and the state of contact of the wheels to the road surface are detected.

The control permission flag setting unit 21 determines whether or not to permit the bulk-up deceleration based on the master pressure sensor and the like detecting the brake operation of the driver, and detection result of the transmission state detection unit 22 sent through CAN or the like, and sets the control permission flag fc.

The bulk-up rate calculating unit 23 calculates a driver-requested deceleration Gd based on the master pressure sensor value, and, based on the control permission flag fc, the detection result of power transmission state, and driver-requested deceleration Gd, calculates a rise-up rate Rr as well as a build-up rate Rb. Here, the rise-up rate means an increase rate of deceleration at the time of launch (rising up) of engine brake whereas the build-up rate Rb means an increase rate of deceleration at the time of further increase (build-up) following the launch of the engine brake.

The rise-up rate accumulating unit 24 calculates the cumulative value Cr of rise-up rate based on the control permission flag fc and rise-up rate Rr. This rise-up rate accumulating unit 24 corresponds to the "first increase control unit".

The build-up rate accumulating unit 25 calculates the cumulative value Cb of build-up rate based on the control permission flag fc and build-up rate Rb. This build-up rate accumulating unit 25 corresponds to the "second increase control unit".

The bulk-up deceleration calculation unit 27 calculates a bulk-up deceleration Gu caused by engine brake based on the rise-up rate cumulative value Cr, build-up rate cumulative value Cb, and the driver-requested deceleration Gd, and the bulk-up deceleration Gu thus calculated will be sent to power train controller via CAN and the like. This bulk-up deceleration calculating unit 27 corresponds to the "deceleration control unit".

Figure 25:
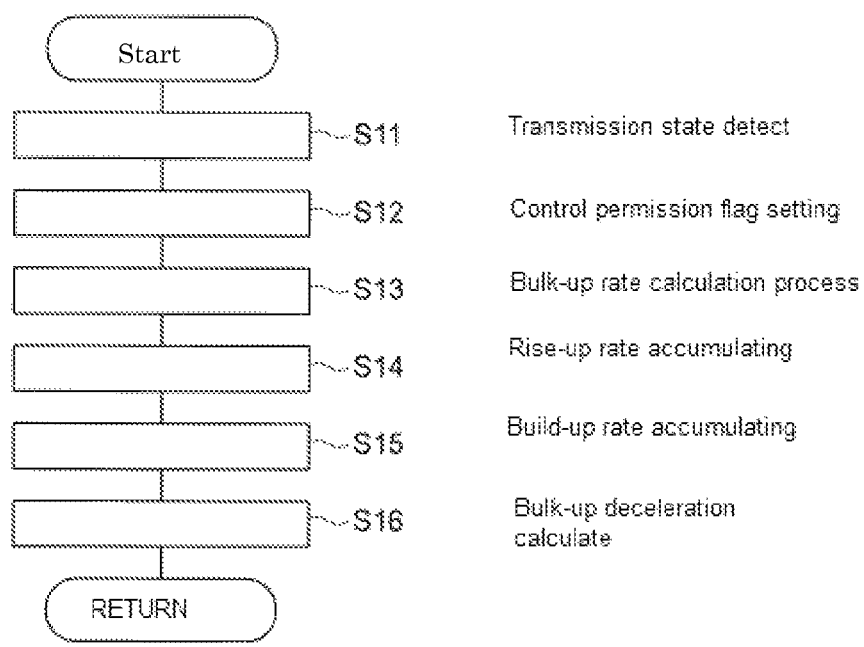
FIG. 25 is a flowchart showing deceleration control process in the fifth embodiment.

FIG. 25 is a flowchart showing deceleration control process in the fifth embodiment. This deceleration control process is performed at every predetermined time (every 10 msec, for example). In the subsequent step S11, the transmission state detection process is performed as described below, and, based on the wheel speed sensor value and shift sensor value, the power transmission state on the driven side of the engine (driving source), i.e., from engine down to tire tread. More specifically, the power transmission state of transmission 15 and a state of the wheels on the road surface ground. This process in step S11 corresponds to the "transmission state detection unit".

First, in step S12, the control permission flag setting process is executed to be described later, on the basis of the master pressure sensor value, the wheel speed sensor value, and transmission state to determine the necessity of bulk-up deceleration control and sets the control permission flag fc.

In the subsequent step S13, the bulk-up rate calculation process to be described later is executed, and calculates a driver-requested deceleration based on the master pressure sensor value, and, based on the control permission flag fc, driver-requested deceleration, and power transmission state, both the rise-up rate and build-up rate are calculated.

In the subsequent step S14, the rise-up rate accumulating process is executed to be described later, and, based on the control permission flag and rise-up rate Rr, the cumulative amount Cr of rise-up rate Rr is calculated. This process in step S14 corresponds to the "first increase control unit"

In the subsequent step S15, the build-up rate accumulating process is executed to be described later, and based on the control permission flag fc and build-up rate Rb, the cumulative value Cb of build-up rate Rb is calculated. The process in the step S15 corresponds to the "second increase control unit".

In the subsequent step S16, the bulk-up deceleration calculation process to be described later, is executed, and based on the rise-up rate cumulative value Cr, build-up rate cumulative value Cb, and the driver-requested deceleration Gd, the bulk-up deceleration Gu is calculated and sent to power train controller 14. The process in this step S16 corresponds to "deceleration control unit".

Figure 26:
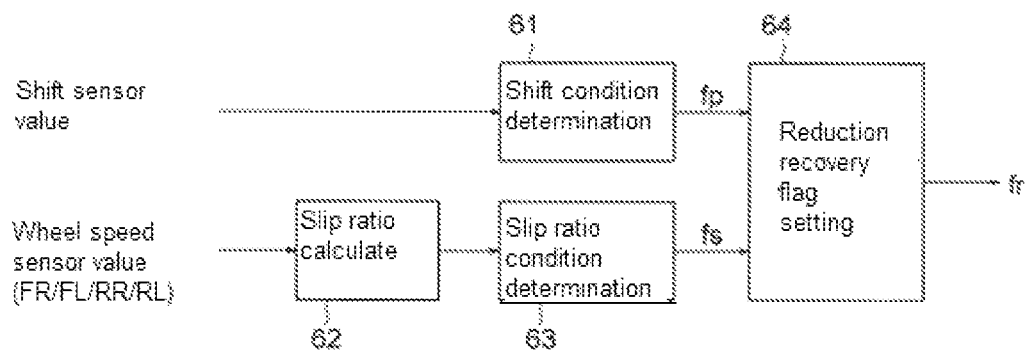
FIG. 26 is a block diagram showing a transfer state detection process.

Then, the transmission state detection process will be described. FIG. 26 is a block diagram illustrating a transmission state detecting process of the fifth embodiment. The shift condition determining unit 61 sets a cut flag fp depending on the value of shift sensor for detecting a shift position of the transmission. The slip ratio calculation unit 62 calculates a slip ratio S of wheel in accordance with wheel speed sensor value detecting a wheel speed.

The slip ratio condition determining unit 63 sets the cut flag fs in accordance with the slip ratio S. The state flag setting unit 64 sets reduction return flag fr depending on cut flag fp and cut flag fs.

Figure 27:
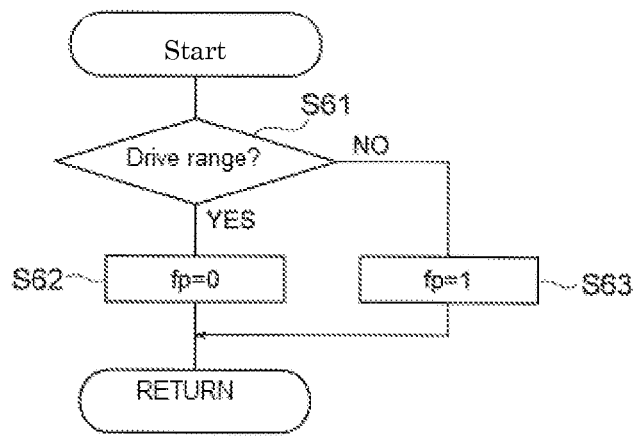
FIG. 27 is a flow chart illustrating a shift condition determination process.

Now, description is made of the shift condition determination process. FIG. 27 is a flowchart illustrating a shift condition determination process of the fifth embodiment. In step S61, it is determined whether or not the shift position of the transmission 15 is set in driving range (D range). Here, when set in the driving range, the power transmission state is considered in a steady state, and control proceeds to step S62.

On the other hand, when the shift position of transmission 15 is set in non-driving range (N range), the power transmission state is determined to be in a disconnected state, control proceeds to step S63.

In step S62, by setting cut flag fp to "0", this shift condition determination process ends. By the engine cut flag fp being "0", it is indicated that the power transmission state is in a disconnected state.

Figure 28:
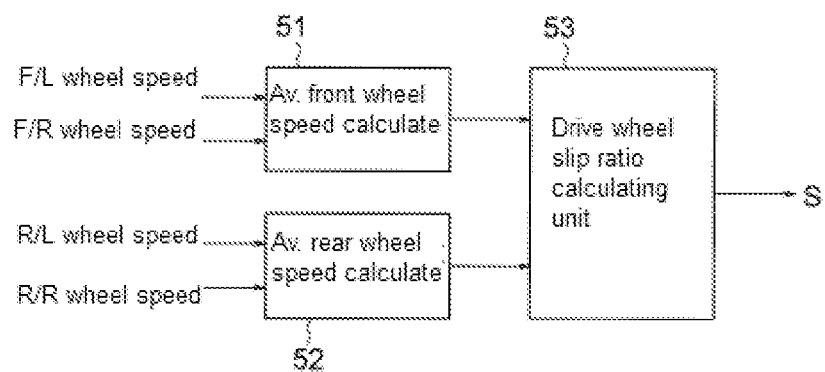
FIG. 28 is a block diagram showing a slip rate calculation process.

Now, description is made of the slip ratio calculating process. FIG. 28 is a block diagram illustrating a process for calculating slip ratio in the fifth embodiment. The average front wheel speed calculating unit 51 calculates an average wheel speed of the wheel speed sensor value of left front wheel speed sensor value and the right front wheel speed sensor value.

The average rear wheel speed calculating unit 52 calculates an average wheel speed of the wheel speed sensor value of left rear wheel speed sensor value and the right rear wheel speed sensor value.

The driving wheel slip ratio calculating unit 53 calculates a slip ratio S by dividing the value obtained by subtracting the average front wheel speed of driving wheel (her, rear wheels) from the average wheel speed of the driven wheels (here front wheels) by the average wheel speed of the driven wheels.

Figure 29:
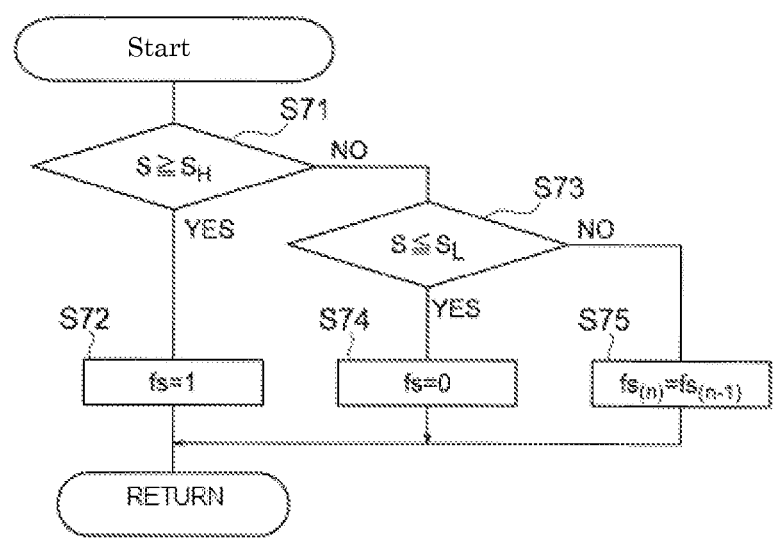
FIG. 29 is a flow chart showing a slip rate condition determination process.

Now, description is made of the slip rate condition determination process. FIG. 29 is a flowchart showing the slip ratio condition determination process in the fifth embodiment. In step S71, it is determined whether or not the slip ratio S is higher than the predetermined value SH. When the determination result indicates that S it is determined that the driving wheels are in a slip tendency and the power transmission state is in a reduced state from the steady state, and control proceeds to step S72. On the other hand, when the determination result indicates that S<SH, control proceeds to step S73.

In step S72, after setting the cut flag fs to "1", the slip rate condition determination process ends. When the cut flag fs is "1", it is indicated that the power transmission state is in a reduced state from the steady state.

In Step S73, it is determined whether or not the slip ratio S is less than a predetermined value SL (SL<SH). When the determination result indicates that SSL, it is determined that the driving wheel is not in a slip tendency, or the slip tendency of driving wheels is converging, and thus the power transmission state is determined to be in a steady state, control proceeds to step S74. On the other hand, when the determination result indicates that S>SL, control proceeds to step 74.

In step S74, by setting the cut flag fs to "0", this slip ratio condition determination process ends. When the engine brake cut flag fs is "0", it is indicated that the power transmission is in a steady state.

Figure 30:
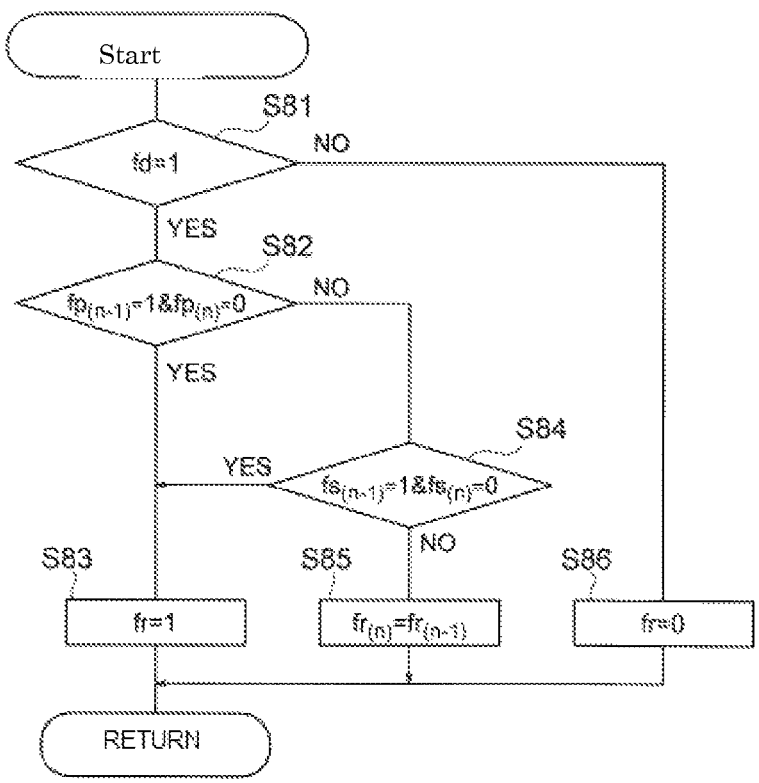
FIG. 30 is a flow chart showing a reduction return flag setting process.

Now, description is made of reduction return flag setting process. FIG. 30 is a flowchart showing a reduction return flag setting process in the fifth embodiment. In step S81, it is determined whether or not the driver-requested flag fd is set to "1". When the determination result indicates that fd=1, it is determined that the driver wants to slow down and the control proceeds to step S82. On the other hand, when the determination result indicates that fd="0", it is determined that the driver does not request for deceleration and control proceeds to S86.

In Step S82, it is determined whether or not the previous value of cut flag fp(n−1) is "1" and the current value fp(n) is equal to "0". When the determination result indicates that fp(n−1) is "1" and fp(n) is "0", upon return of shift position from non-driving range (N range) to driving range (D range), it is determined that the power transmission state has returned from disconnected state to steady state, control proceeds to step S83. On the other hand, when the determination result indicates that fp(n−1) is "0" or fp(n) is "1", it is determined that the shift position remains in the driving range (D range), and the power transmission state remains in the steady state, or the shift position is in non-driving range (N range) and the power transmission state is in disconnected state, and control proceeds to step S84.

In step S83, by setting reduction return flag fr to "1", the reduction return flag setting process ends. When the reduction return flag fr is "1", it is indicated that the power transmission state returns from disconnected state to steady state.

In step S84, it is determined whether or not the previous value of cut flag fs is "1", and the current value fs(n) is "0". When the determination result indicates that fs(n−1) is "1", and fs(n) is "0", it is determined that the slip tendency has converged and the power transmission state returns from reduced state to the steady state, control proceeds to step S83. On the other hand, when the determination result indicates that fs(n−1) is "0", or fs(n) is "1", it is determined that slip tendency is not present and power transmission state remains in the steady state, or slip tendency has not converged and the power transmission state is in reduced state, control proceeds to step S85.

In step S85, by setting the previous value of reduction return flag fr(n−1) to current value fs(n) (maintained), the reduction return flag setting process ends.

In step S86, by resetting the reduction return flag fr to "0", the reduction return flag process ends.

Figure 31:
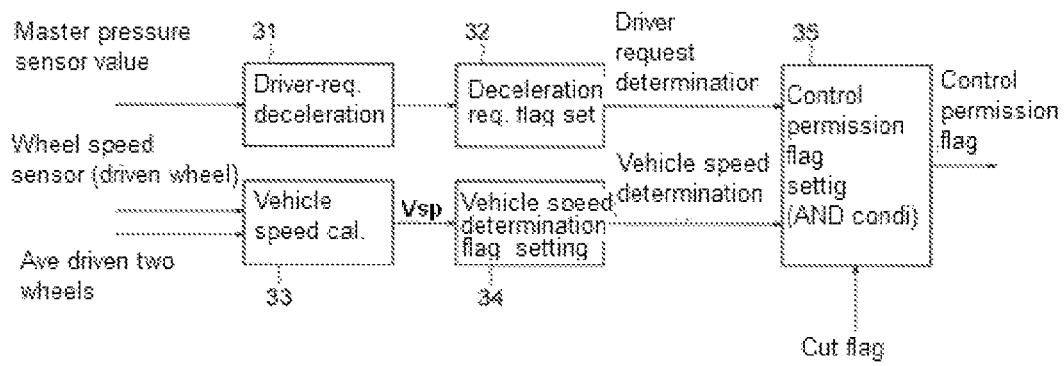
FIG. 31 is a block diagram showing a control permission flag setting process in the fifth embodiment.

Now, description is made of the process of control permission flag setting. FIG. 31 is a block diagram showing a control permission flag setting process in the fifth embodiment. The driver-requested deceleration calculating unit 31 calculates the driver-requested deceleration based on a master pressure sensor value. The deceleration request determination flag setting unit 32 determines whether or not the driver-requested deceleration Gd is equal to or greater than a predetermined threshold value Gt1 (0.05 G, for example), and if Gd≥Gt1, then it is determined that the driver requests a deceleration and the deceleration request determination flag is set to fd=1. On the other hand, if Gd<Gd1, it is determined that the driver does not wish a deceleration and the deceleration request determination flag fd is set to zero, i.e., fd=0.

Note that, in order to avoid occurrence of hunting of the deceleration request determination flag, once the deceleration request determination flag fd has been set to 1, when the driver-requested deceleration Gd falls below a predetermined threshold Gt2 (0.02 G, for example) which is less than the threshold Gt1, the deceleration request determination flag fd will be reset to zero, i.e., "fd=o".

The vehicle speed calculating unit 33 reads wheel speed sensor values associated with driven wheels, for example, and calculates a vehicle speed as the average value of the two wheel speed readings.

The vehicle speed determination flag setting unit 34 determines whether or not the vehicle speed V exceeds a predetermined threshold value Vt1 (40 km/h for example), and if V≥Vt1, it is determined that the deceleration is required to be boosted upon driver's request, and vehicle speed determination flag is set to one, i.e., fv=1.

On the other hand, if V<Vt1, it is determined that the deceleration is not needed to be raised in bulk-up fashion even at the driver's deceleration request, and the vehicle speed determination flag fv is reset to zero, i.e., fv=0. Note that, in order to avoid hunting of vehicle speed determination flag, once the vehicle speed determination flag fv has been set to one, then vehicle speed determination flag fv may be reset to zero, when vehicle speed falls below a threshold Vt2 (30 km/h for example) less than the threshold Vt1 described above.

The control permission flag setting unit 35 determines that the deceleration has to be boosted when the deceleration request determination flag, fd equals to "1", the vehicle speed determination flag, fv equals to "1", and cut flag fp is "0", and sets the control permission flag fc to "1", i.e., fc=1. On the other hand, when one of the following criteria that deceleration request determination flag fd is "zero" or vehicle speed determination flag, fv is "zero", or vehicle speed determination flag fv is "0", it is determined that no need exists to boost or "bulk-up" the deceleration and the control permission flag fc will be reset to "zero".

Next, description is made of bulk-up rate calculating process.

Figure 32:
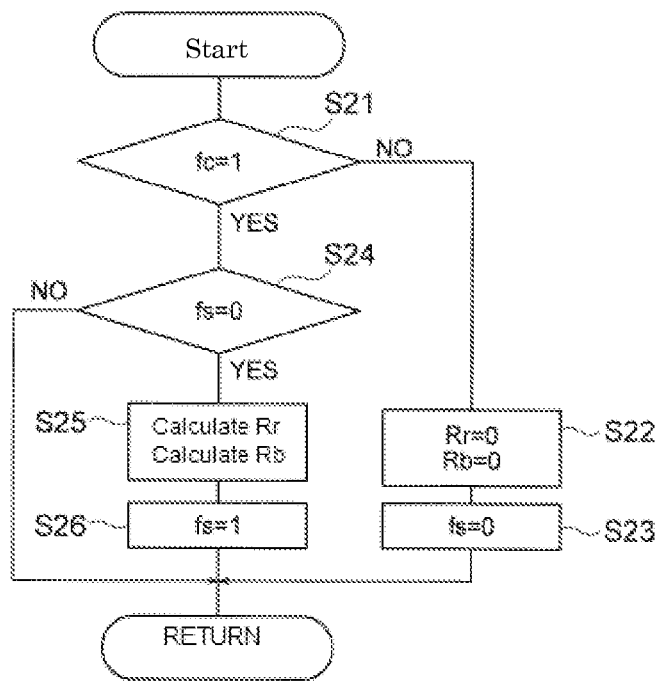
FIG. 32 is a flow chart illustrating a process for calculating the boost or bulk-up rate in the fifth embodiment.

FIG. 32 is a flowchart showing the bulk-up rate calculating process in the fifth embodiment. Firstly, in step S21, it is determined whether or not the control permission flag fc is set to "1". When the determination results indicates fc being "0", the bulk-up of deceleration is determined not necessary, and control proceeds to step S22. On the other hand, if the determination result indicates fc being "1", bulk-up of deceleration is determined to be necessary and process proceeds to step S24.

In step S22, as shown below, both the rise-up rate, Rb and build-up ratio Rr are reset: Rr=0 and Rb=0.

In the subsequent step S23, after resetting the set flag to "0", control ends this bulk-up rate calculating step.

In step S24, it is determined whether or not the set flag is reset to "0". When the determination results indicates fs being "1", it is determined that both the rise-up rate Rr and build-up rate Rb have been set already, and the bulk-up rate calculating process is terminated. On the other hand, when the set flag fs is "0", both the rise-up rate Rr and build-up rate Rb are determined to be unset, and control proceeds to step S25.

In step S25, reference is made to the map, and in accordance with the driver-requested deceleration Gd and reduction return flag dr, both the rise-up rate Rr and build-up rate Rb will be calculated.

Figure 33:
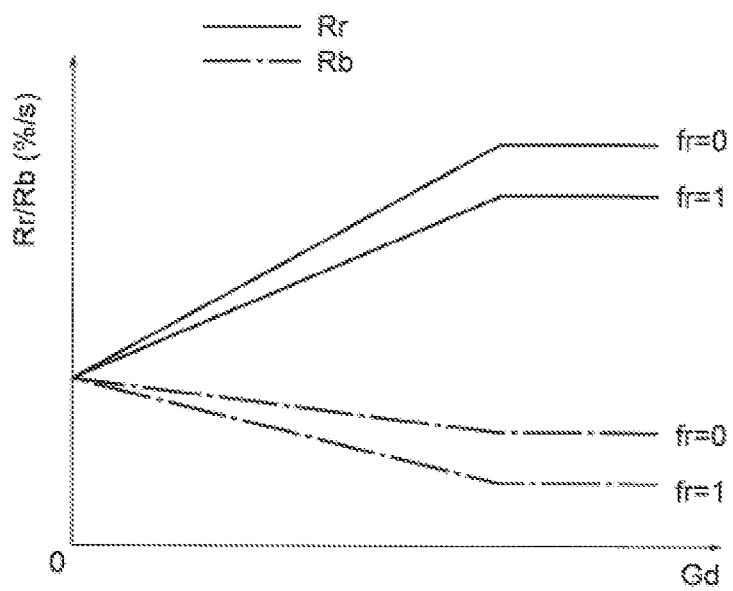
FIG. 33 is a map used to calculate the rise-up rate and build-up rate.

FIG. 33 is a map used to calculate the rise-up rate and build-up rate. When the driver-requested deceleration Gd is "0", both the rise-up rate Rr and build-up rate Rb have the same value in a range greater than "0". Further, as the driver-requested deceleration Gd increases, the rise-up rate Rr increases and build-up rate Rb decreases in the range greater than zero. In addition, when the reduction return flag fr is "1", both the rise-up rate Rr and build-up rate Rb are smaller compared to the case in which fr is "0". The map in FIG. 33 corresponds to "increase rate correction unit". In the subsequent step S26, by setting the set flag fs to "1", this bulk-up rate calculating process ends.

Now, description is made of rise-up rate accumulating process.

Figure 34:
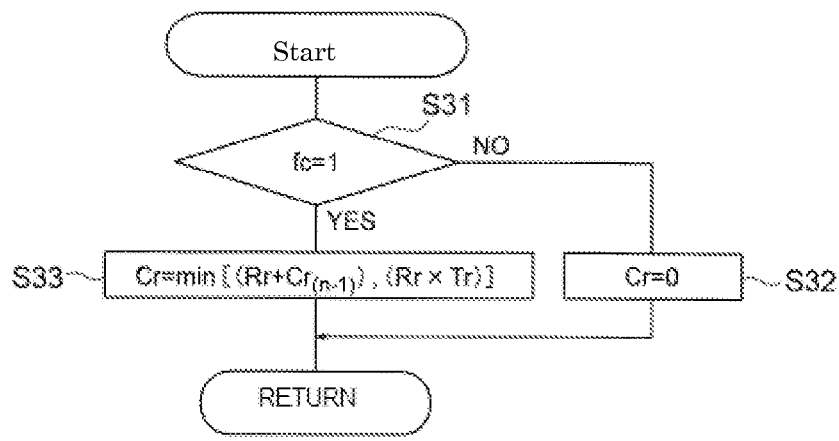
FIG. 34 is a flow chart showing the rise-up rate cumulative process in the fifth embodiment.

FIG. 34 is a flowchart showing an accumulating process of the rise-up rate in the fifth embodiment. First, in step S31, it is determined whether nor not the control permission flag, fc is set to "1". When the determination result indicates fc being "0", bulk-up of deceleration is determined unnecessary, and control proceeds to step S32. On the other hand, when the determination result reveals fc being "1", bulk-up of deceleration is determined necessary and control proceeds to step S33.

In step S32, as described below, after the rise-up rate cumulative value Cr is reset to "0", this rise-up accumulating process is exited. Cr=0

In step S33, as shown below, by setting the smaller one of rise-up rate cumulative value of (Rr+Cr(n−1)) and the maximum value of rise-up rate (Rr×Tr) as the rise-up rate cumulative value Cr, this rise-u rate cumulative process ends.

$Cr=\min[(Rr+Cr(n-1)),(Rr\times Tr)]$

Here, Tr is a rise-up time that is set in advance. The rise-up time Tr represents a maximum time (maximum number of times) for rise-up i.e., during which accumulation or increment by Rr at every calculation cycle is possible.

Figure 35:
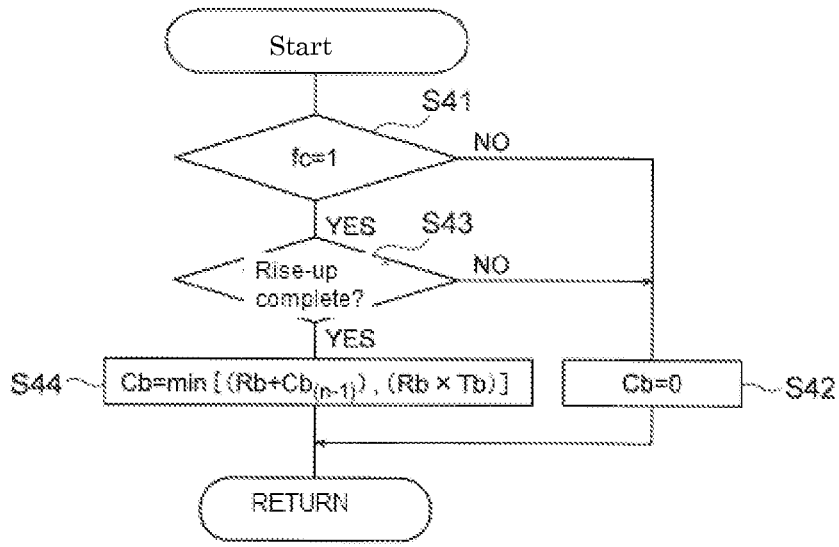
FIG. 35 is a flow chart showing the build-up rate cumulative process in the fifth embodiment.

Now, description is made of the build-up accumulating process. FIG. 35 is a flowchart showing a build-up rate accumulating process in the fifth embodiment.

First in the step S41, it is determined whether or not the control permission or enabling flag, fc is set to "1". When the determination result indicates fc being "0", bulk-up of deceleration is determined unnecessary, and process proceeds to step S42. On the other hand, when determination result indicates that fc is "1", it is determined that bulk-up of deceleration is necessary and control proceeds to step 43.

In step S42, as shown below, the build-up rate cumulative value Cb is reset, and the build-up cumulative processing ends. Cb=0.

On the other hand, in step S43, it is determined whether or not the rise-up has completed. More specifically, the rise-up is considered as being complete if the rise-up cumulative value Cr has reached the maximum value (Rr×Tr). When the rise-up has not yet completed, control proceeds to step S42 described above. On the other hand, at completion of rise-up, control advances to step S44.

In step S44, as shown below, after setting as build-up rate cumulative value Cb the smaller one of build-up rate cumulative value (Rb+Cb(n−1)) or maximum value of build-up rate, (Rb×Tb), control terminates this build-up rate accumulating process. The process in this step Cb=min[(Rb+Cb(n−1)), (Rb×Tb)].

Here, Tb is the build-up time that has been set in advance. The build-up time Tb represents a maximum time (maximum number of times) during which built up may be carried out, i.e., incremented can be made by Bb at every calculation cycle.

Figure 36:
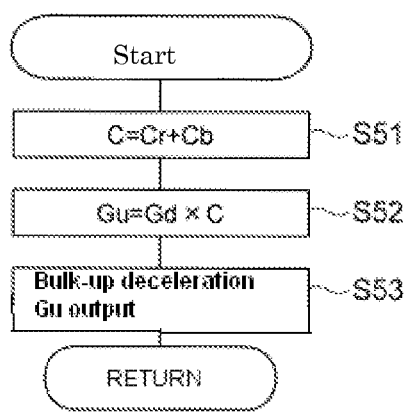
FIG. 36 is a flow chart showing a process of calculating a boost or bulk-up deceleration in the fifth embodiment.

Now, description is made of bulk-up deceleration calculating process. FIG. 36 is a flowchart showing a process of calculating a bulk-up deceleration in the fifth embodiment. In step S51, first, as shown below, by adding the rise-up rate cumulative value Cr to the build-up rate cumulative value Cb to calculate a bulk-up rate cumulative value C; C=Cr+Cb.

In step S52, as shown below, by multiplying the bulk-up rate cumulative value C and driver-requested deceleration Gd to obtain the bulk-up deceleration Gu; Gu=Gd×C. In the subsequent step S53, subsequent to outputting the bulk-up deceleration Gu to power train controller 14, the bulk-up deceleration calculating process ends. The process in this step S53 corresponds to the "deceleration control unit". Note that, when returning the bulk-up deceleration Gu to "0", the release speed will be limited by applying a rate limiter process.

In the present embodiment, in accordance with power transmission state of transmission 15 and a state of ground contact of wheels to road surface, the power transmission state on the driven side of the engine (driving source), i.e., from engine down to tire tread or tire contact onroad surface is detected. More specifically, cut flag fp is set depending upon the shift position of transmission 15 and cut flag fs is set depending on the slip ratio of driving wheel, and depending on set states of these cut flags fp, fs, the reduction return flag fr is set.

Figure 37:
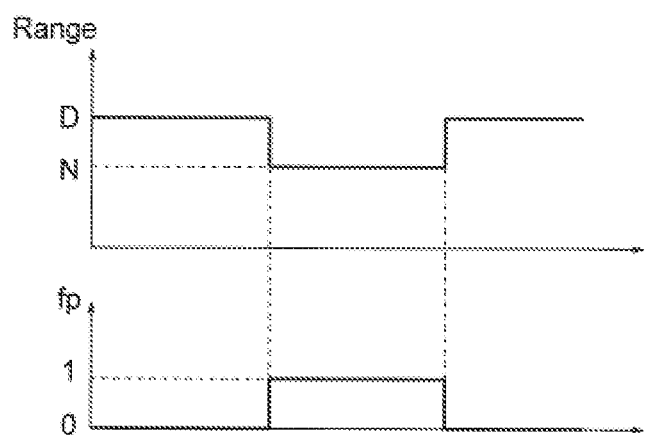
FIG. 37 is a time chart of the cut flag fp.

FIG. 37 is a time chart of the cut flag fp. When the shift position is in drive range (D range), since the power transmission state is in steady state and operation of engine brake is available, cut flag fp is reset to "0". When the shift position is switched to the non-driving range (N range) from this state, since the power transmission state is in disconnected state and engine brake operation is unavailable, cut flag fp is set to "1". Further, when the shift position is returned to drive range (D range) again, cut flag fp is reset to "0".

Figure 38:
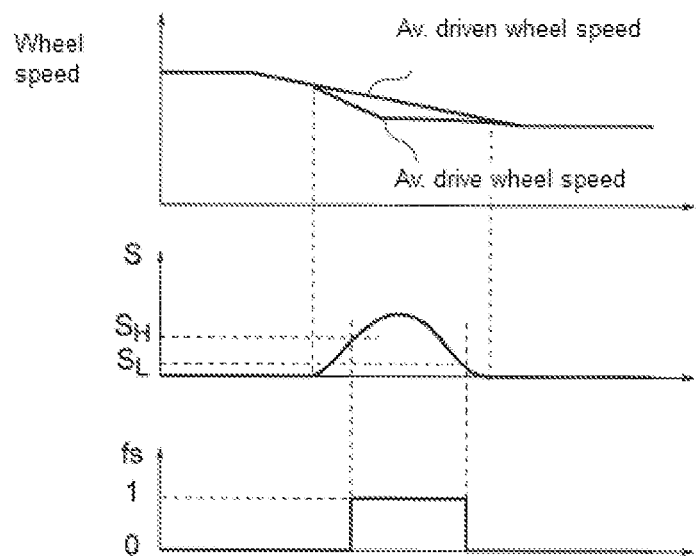
FIG. 38 is a time chart of the cut flag fs.

FIG. 38 is a time chart of the cut flag fs. Without the drive wheels tending to slip, since the average wheel speed of drive wheels and the average wheel speed of driven wheels are about the same, slip ratio S is about "0".

At this time, since the power transmission state is in a steady state and engine brake operation is available, cut flag fs is reset to "0". When the drive wheel slip tendency has increased from this state, since the average wheel speed of drive wheels will be higher than the average wheel speed of driven wheels, the slip ratio S increases. Further, when the slip ratio S exceeds a set value SH, it is determined for slip tendency. In this case, since the power transmission state is reduced from the steady states, and engine brake operation is suppressed, cut flag fs is set to "1". Further, when the slip ratio S falls down again, and decreases below the set value SL, it is determined that the slip tendency has converged. Since the set values are different between a situation in which cut flag fa is set to "1" and the situation in which the cut flag fs is switched to "0", hunting may be suppressed.

Figure 39:
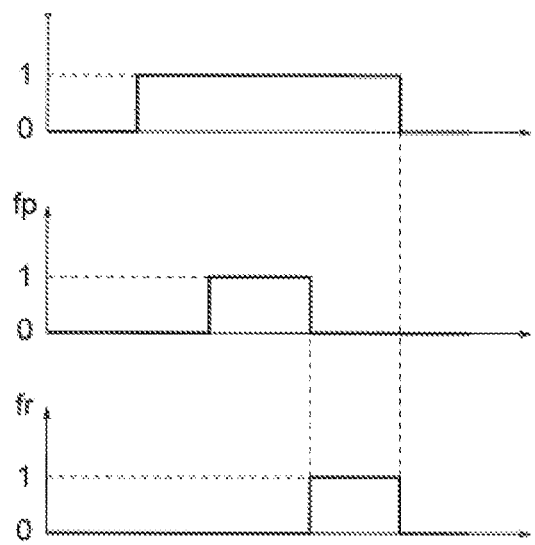
FIG. 39 is a time chart of reduction return flag fr.

FIG. 39 is a timing chart of reduction return flag fr. If the brake pedal is in non-operational state, the driver request flag is "0", i.e., fd=0 ("No" determination in S81), and the reduction return flag is always "0", i.e. fr=0 (S86). Upon the brake pedal being operated, driver request flag fd is set to "1" (the judgment in step S81 is "YES"). Further, when the shift position changes from non-driving range (N range) to driving range (D range), since cut flag fp switches from 1 to 0 (the judgment in step S82 is "YES"), the reduction return flag fr switches from 0 to 1 (step S83). In this manner, in accordance with cut flag fp and fs, reduction return flag fr will be set.

On the other hand, in accordance with the set states in driver request flag fd, vehicle speed determination flag fv, and cut flag fp, control permission flag fc will be set.

Figure 40:
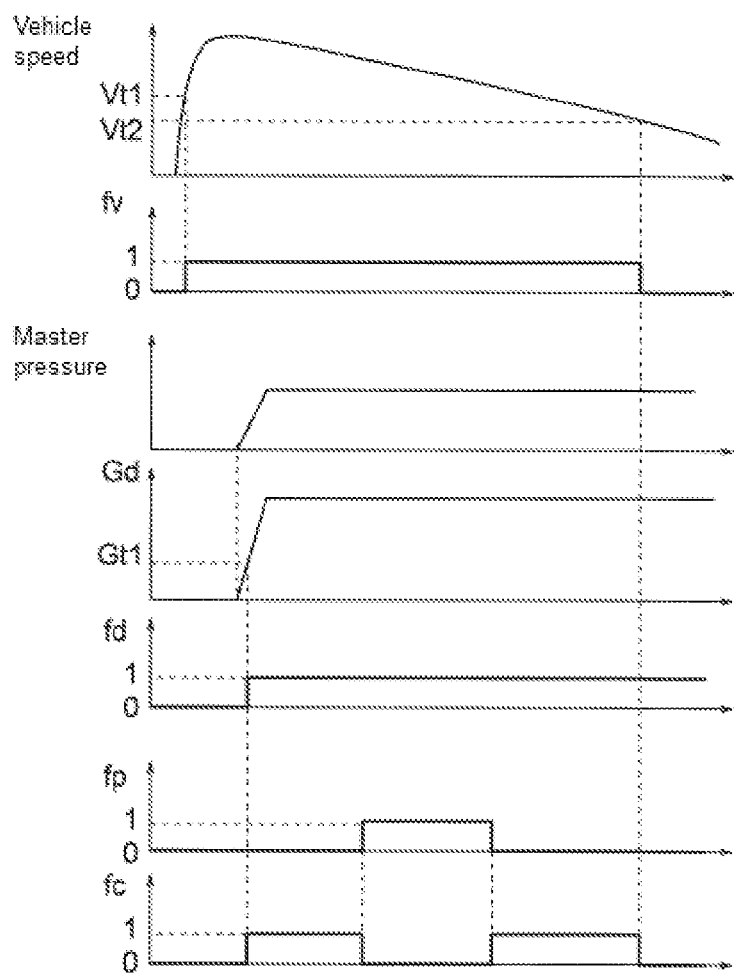
FIG. 40 is a time chart showing a control permission flag.

FIG. 40 is a time chart showing a control permission flag. First, when the vehicle speed V is equal to or greater than the threshold value Vt1 (40 km/h, for example), the vehicle speed determination flag fv is set to "1". Then, based on the master cylinder pressure sensor value, the driver-requested deceleration is calculated from various factors or specifications associated with friction brake or the like, and when the driver-requested deceleration exceeds the threshold value G0 (0.05 G, for example), the deceleration request determination flag fd is set to "1".

When the vehicle speed determination flag fv is "1", the deceleration request determination flag fd is "1", and the cut fp is "0", the control permission flag fc for allowing a rise-up and build-up for increasing the deceleration by engine brake is set to "1" (step S12). In other words, when the vehicle travels at a certain vehicle speed while the driver requests a deceleration and the power transmission state is in steady state, the rise-up and build-up may be executed.

Figure 41:
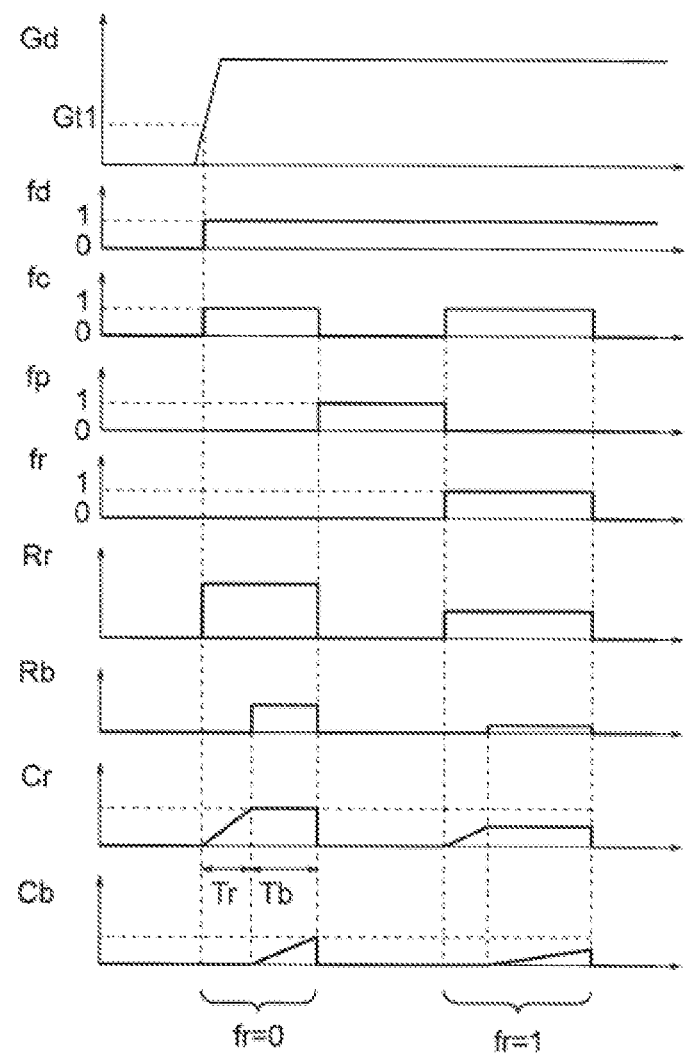
FIG. 41 is a time chart showing a rise-up rate Rr, build-up rate Rb, and rise-up rate cumulative value Cr as well as build-up rate cumulative value Cb.

FIG. 41 is a time chart showing the rise-up rate Rr, build-up rate Rb, rise-up rate cumulative value Cr, and build-up rate cumulative value Cb. Depending on the driver-requested deceleration Gd, both the rise-up rate Rr and build-up rate Cb are set (step S13, FIG. 33). Rise-up rate Rr is larger than the build-up rate Rb, and as the driver-requested deceleration Gd is larger, rise-up rate Rr will be greater while the build-up rate Rb will be smaller. In addition, when the reduction return flag fr is "1", as compared to the situation in which fr is "0", both rise-up rate Rr and build-up rate Rb will decrease.

Thus, since at the initial stage of driver's brake operation, the increase or growth rate becomes high, and exhibits a lower increase from mid- to later stage, the biting performance at the initial stage of brake operation is good, while the control conveys to the driver a sense of security while giving no feel of discomfort due to the gradual increase in deceleration from mid- to later stage.

Further, the amount of change (gradient or slope) in the rise-up rate with respect to the amount of change in driver-requested deceleration Gd is larger than the amount of change (gradient or slope) in the build-up rate with respect to the amount of change in driver-requested deceleration Gd. Thus, as the braking force of the driver is larger, the greater the biting engagement in the initial stage of braking, thereby a sense of security is given to the driver.

Further, an upper limit is also posed on the rise-up rate Rr. Thus, it is possible to suppress excessive engine brake being applied, and an increase in engine noise is suppressed. When both the rise-up rate Rr and build-up rate Rb have been set, then rise-up rate cumulative value Cr is calculated (step S14).

Specifically, when control permission flag fc is "1" (the judgment in step S31 is "YES"), by incrementing by Rr at every calculation cycle, rise-up rate cumulative value Cr is calculated (step S35).

The rise-up cumulative value Cr is restricted by the maximum value (Rr×Tr). Tr denotes a rise-up time, and represents a maximum time during which accumulation or increment by Rr is possible every calculation period. Thus, the rise-up cumulative value Cr will be prevented from being excessively increased. Therefore, excessive engine breaking is avoided from being applied so that an increase in engine noise may be suppressed.

Once the rise-up rate cumulative value Cr has been calculated, the build-up rate cumulative value Cb is calculated (step S15).

More specifically, when control permission flag fc is set "1" and rise-up has been completed, (i.e., both judgments in steps S41, S43 turn out to be "YES"), by accumulating by Rb at every calculation period, the build-up rate cumulative value Cb is calculated (step S44). On the other hand, unless the rise-up has been completed (i.e., judgment in step S43 is "NO"), the rise-up rate cumulative value Cb is set to "0" (step S42).

The build-up cumulative value Cb is limited by the maximum value (Rb×Tb). Tb denotes the build-up time and represents a maximum time period during which accumulation is carried out by Rb at every calculation period. Thus, the build-up cumulative value Cb will be prevented from being excessively increased.

Thus, once the build-up cumulative value Cb has been calculated by adding the rise-up cumulative value Cr and build-up cumulative value Cb, a final bulk-up rate cumulative value C is obtained (step S51). Further, by multiplying this bulk-up cumulative value by the driver-requested deceleration Gd, the bulk-up deceleration Gu is calculated for output (step S52, 53).

Figure 42:
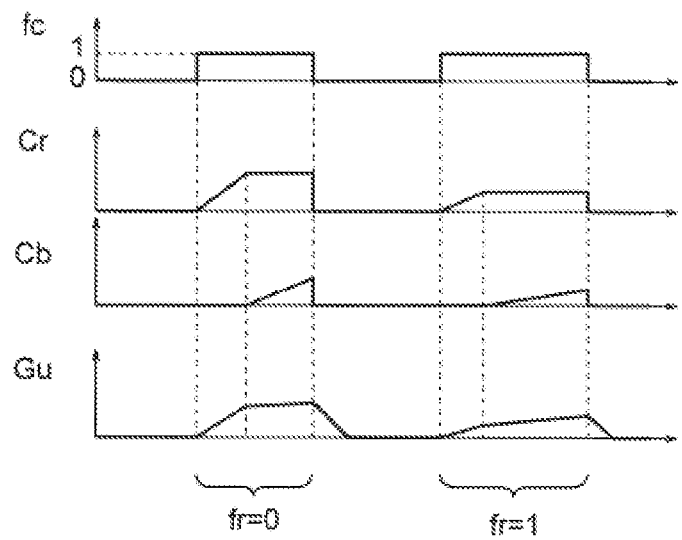
FIG. 42 is a time chart of boost or bulk-up deceleration Gu.

FIG. 42 is a time chart showing a bulk-up deceleration Gu. During rise-up, the rise-up rate cumulative value Cr increases while the build-up rate cumulative value maintains "0". Conversely, during the period of build-up which is initiated upon completion of the rise-up process, the build-up rate cumulative value Cb increases and the rise-up cumulative value Cr holds "Rr×Tr".

The maximum value of the build-up rate cumulative value C is given by adding the maximum value (Rr×Tr) of rise-up rate cumulative value and the maximum value of the build-up cumulative value (Rb×Tb).

As described above, while providing engine brake that imparts deceleration to the vehicle in a state in which the driving source is driven by the driven side, the deceleration by engine brake will be increased at a rise-up rate Rr. Further, when a predetermined time has elapsed since the deceleration has been increased by the rise-up rate Rr, then the deceleration at this time will further increased at a build-up rate Rb which is set smaller or less than the rise-up rate Rr.

Stated another way, the deceleration is increased at the rise-up rate Rr first when the driver is holding the brake operation amount, so that the driver may realize a good brake feel or effectiveness (biting performance) at the initial stage of brake operation.

Subsequently, since the deceleration is increased at a build-up rate Rb less than the rise-up rate Rr, the braking force gradually increases across the mid- and final stages of brake operation. Thus as the vehicle approaches a preceding vehicle or the stop line, the corrective action such as to increase in the progressive depression of brake pedal may be suppressed. In this way, the driver's brake operation will be able to be assisted and the burden of operation may be lessened.

Incidentally, assuming that, while engine brake is being increased, the driver changes the shift position from D range to N range, and subsequently returns from N range to D range. In this case, when the driver holds the brake operation, since engine brake is increased again after having been released once, the variation in deceleration is increased.

Thus, when the power transmission state on the driven side of engine decreases from steady state, and, subsequently returns to the steady state, the reduction return flag fr is switched from "0" to "1". Therefore, as compared to the case of reduction return flag fr being "0", both the rise-up rate Rr and build-up rate Rb are kept small. Thus, when engine brake is released temporarily and subsequently returned, the increase in the variation in deceleration may be suppressed. In other words, the increasing gradient or slope of deceleration will be made gradual when increasing engine brake again.

When the control permission flag fc has been reset to "0" and the bulk-up deceleration Gu is returned to "0" quickly, the abrupt return of the bulk-up deceleration Gu to "0" would give the driver a sense of discomfort so that, when the bulk-up deceleration Gu is released, a rate limiter is applied on the release speed (decrease rate). As a result, a sense of loss of deceleration is avoided to be given.

With respect to the power transmission state, detection is started of a shift position of the transmission 15 first. In other words, when the shift position has changed from drive range (D range) to non-driving range (N range), it is determined that the power transmission state has been disconnected from the steady state. Also, when the shift position has changed from the non-driving state (N range) to drive range (D range), it is determined that the power transmission has recovered or returned to the steady state again. In this manner, because of the detection based on the shift position of transmission 15, the disconnection of power transmission and its recovery may be easily and accurately detected.

Further, the power transmission state is detected also from the driving wheel slip ratio S. That is, it is determined, when the slip ratio S is greater than the set value SH, that the power transmission state has reduced or decreased from the steady state. Further, thereafter, when the slip ratio S has fallen below the set value SL, it is determined that the power transmission state has recovered to the steady state. In this manner, because of the detection based on the drive wheel slip ratio S, the reduction of power transmission state and its recovery may be easily and accurately detected.

Note that, in a hydraulic friction brake mechanism generating a braking force to the wheels, according to the driver's brake operation, the normal braking force is generated. Therefore, since the brake force may vary in response to the driver's operation on brake, the deceleration of the vehicle is kept under control by the driver. Thus, since operability or controllability is secured, this control does not give the driver an uncomfortable feel.

"Modifications" In the present embodiment, when the reduction return flag fr is "1", as compared to the situation in which fr is "0", in order to correct to decrease the increase rate of the bulk-up deceleration Gu, both rise-up rate Rr and build-up rate Rb are corrected to decrease. However, this arrangement does not pose any limitation. In other words, even the correction to decrease of at least one of the rise-up rate Rr and build-up rate Rb will produce the same effect as the present embodiment.

Moreover, it would also suffice to set the rise-up rate Rr to "0" and to start increasing the build-up rate Rb from this point in time. In other words, by omitting the rise-up, build-up alone may be performed.

Figure 43:
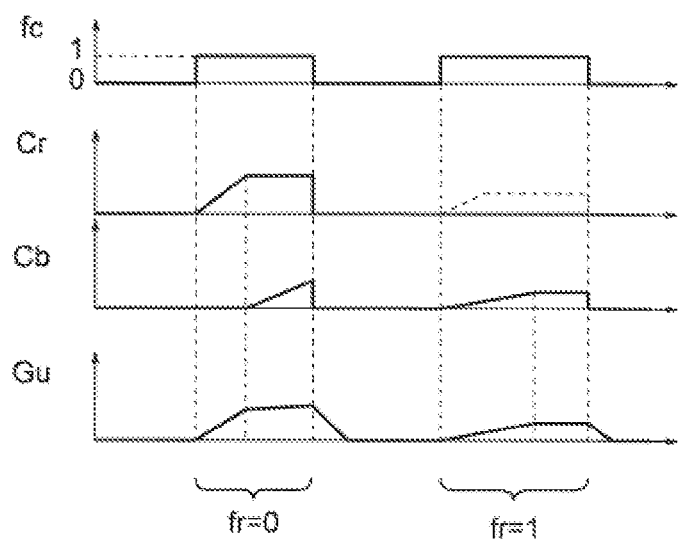
FIG. 43 is a time chart to perform only build-up process.

FIG. 43 is a time chart to perform the build-up only. In this way, while setting the rise-up rate Rr to "0" and even with increase of build-up Rb from this point in time, the increase rate of bulk-up deceleration Gu may be corrected to decrease, and the effect similar to the present embodiment may be obtained.

In sum, the bulk-up deceleration calculating unit 27, the process in step S16, in particular the process in step S53 correspond to the "deceleration control unit", the rise-up cumulative unit 24 and the process in step S14 correspond to the "first increase control unit", the build-up cumulative unit 25 and the process in step S15 correspond to the "second increase control unit". Further, shift sensor 16, transmission state detection unit 28, and the process in step S11 correspond to the "transmission state detection unit", and the map in FIG. 33 corresponds to the "increase rate correction unit".

(1) According to the deceleration control apparatus for a vehicle of the present embodiment, when the driver has performed a brake operation, the deceleration caused by engine brake is increased at the rise-up rate Rr. When increased at this rise-up rate Rr for a predetermined time Tr, from the deceleration attained at this instant the deceleration caused by engine brake will be further increased at the build-up rate Rb which is less than the rise-up rate Rr. When detecting that the power transmission state on the engine driven side has reduced from the steady state, and subsequently returned or recovered to the steady state, the increase in deceleration caused by engine brake will be corrected to decrease.

In this manner, when the driver operates on brake, since the deceleration is increased, brake operation by the driver may be assisted. Moreover, when the power transmission state on the engine driven side has reduced from the steady state and thereafter recovered to the steady state, correction to decrease the increase rate of deceleration may suppress, the variations in deceleration.

(2) According to the deceleration control for a vehicle of the present embodiment, when it is determined, when the shift position of transmission 15 has changed from D range to N range, that the power transmission state has reduced from the steady state. Moreover, thereafter, when the shift position has recovered from N range to D range, it is determined that recovery to steady state takes place.

In this manner, because of the detection based on the shift position of transmission 15, the reduction in power transmission state and its recovery may be detected easily and accurately.

(3) According to the deceleration control device for a vehicle in the present embodiment, it is determined, upon detection of slip tendency of the drive wheel, that the power transmission state has reduced or decreased from the steady state. Also, it is determined, when detecting that the slip tendency has converged thereafter, that the steady state is recovered again. In this manner, since detection is made based on the slip of the drive wheels, reduction in the power transmission state and return thereto can be easily and accurately detected, (4) According to the deceleration control device for a vehicle in the present embodiment, by correcting to decrease the rise-up rate Rr, increase rate of deceleration caused by engine brake is corrected to decrease. This way, by correcting to decrease rise-up rate Rr to correct to decrease the increase rate of deceleration, calculation is easy.

(5) According to the deceleration control device for a vehicle in the present embodiment, by correcting to decrease the build-up rate Rb, increase rate of deceleration caused by engine brake is corrected to decrease. In this way, by correcting to decrease build-up rate Rb to correct to decrease the increase rate of deceleration, calculation operation is easy.

(6) According to the deceleration control for a vehicle in the present embodiment, by setting the rise-up rate Rr to "0" and, from this point in time, by increasing the deceleration at build-up rate Rb, the increase rate of deceleration caused by engine brake is corrected to decrease. In this way, by omitting the rise-up and performing the build-up alone to correct to decrease the increase rate of deceleration, calculation operation is easy.

(7) According to the deceleration control method for a vehicle in the present embodiment, when the driver operates on brake, deceleration caused by engine brake is caused to increase at rise-up rate Rr. When the deceleration caused by engine brake is increased at a rise-up rate Rr for a predetermined time, starting from the deceleration attained at this point in time, deceleration will be further increased at a build-up rate Rb that is less than the rise-up rate. Further, when the power transmission state on the driven side of the engine has reduced from the steady state, and thereafter recovered to the steady state once again, the increase rate of deceleration caused by engine brake is corrected to decrease.

In this way, when the driver operates on brake, since the deceleration will be increased, the brake operation of the driver may be assisted. Further, when the power transmission state on the engine driven side has reduced from the steady state and thereafter returned to the steady state again, since the increase rate of deceleration is corrected to decrease, the variations in deceleration may be suppressed.

As described above, although descriptions have been made with reference to a limited number of embodiments, the scope of right is not limited to those, but it is apparent to those skilled in the relevant art to make modifications based on the disclosure described above.

The invention claimed is:

1. A deceleration control device for a vehicle, comprising:
a deceleration control unit that decelerates the vehicle when a power force of the vehicle is driven from a driven side;
a first increase control unit that increases a deceleration by the deceleration control unit at a first increase rate when a driver holds a brake operation; and
a second increase control unit that increases the deceleration at a second increase rate that is less than the first increase rate when the driver holds the brake operation and the first increase control unit has increased the deceleration by the deceleration control unit for a predetermined time.

2. The deceleration control device for a vehicle claimed in claim 1, further comprising:
a hold control unit that holds the deceleration by the deceleration control unit when the driver is decreasing or increasing the brake operation.

3. The deceleration control device for a vehicle claimed in claim 1, further comprising:
a restriction unit that restricts the deceleration by the deceleration control unit below an upper limit.

4. The deceleration control device for a vehicle claimed in claim 1, further comprising:
an increase rate setting unit that sets the first increase rate and the second increase rate in accordance with brake operation of the driver; wherein
the increase rate setting unit increases the first increase rate while decreasing the second increase rate as the brake operation of the driver increases.

5. The deceleration control device for a vehicle claimed in claim 1, wherein a change amount due to the first increase rate with respect to a change amount of brake operation of the driver is set larger than a change amount due to the second increase rate with respect to the change amount of brake operation of the driver.

6. The deceleration control device for a vehicle claimed in claim 1, wherein the first increase control unit comprises:
a first ending control unit that, after increase in the deceleration by the deceleration control unit for the predetermined time, maintains the deceleration at an end of the predetermined time, and to end the increase in deceleration by the deceleration control unit.

7. The deceleration control device for a vehicle claimed in claim 1, wherein the second increase control unit comprises:
a second ending control unit that, after increase in the deceleration by the deceleration control unit for the predetermined time, maintains the deceleration at an end of the predetermined time, and to end the increase in deceleration by the deceleration control unit.

8. The deceleration control device for a vehicle claimed in claim 1, wherein the first increase control unit sets an upper limit on the first increase rate.

9. The deceleration control device for a vehicle claimed in claim 1, further comprising:
a requested deceleration calculation unit that calculates a requested deceleration in accordance with brake operation of the driver; and
a vehicle speed detection unit that detects vehicle speed; wherein
the first increase control unit increases the deceleration by the deceleration unit at the first increase rate when the requested deceleration calculated by the requested deceleration calculation unit is larger than a predetermined threshold value, the vehicle speed detected by the vehicle speed detection unit is larger than a predetermined threshold value, and the driver holds the brake operation; and
the second increase control unit that increases the deceleration attained at an end of the predetermined time at a second increase rate less than the first increase rate when the requested deceleration calculated by the requested deceleration calculation unit is larger than a predetermined threshold value, the vehicle speed detected by the vehicle speed detection unit is larger than a predetermined threshold value, the driver holds the brake operation, and the first increase control unit has increased the deceleration by the deceleration control unit for the predetermined time.

10. The deceleration control device for a vehicle claimed in claim 3, wherein
the restriction unit lowers the upper limit as the vehicle speed decreases.

11. The deceleration control device for a vehicle claimed in claim 3, wherein
the restriction unit increases the upper limit as a roots-square of a sum of squares of a longitudinal acceleration and a lateral acceleration is larger.

12. The deceleration control device for a vehicle claimed in claim 3, wherein the restriction unit increases the upper limit as a speed of brake operation by the driver increases.

13. The deceleration control device for a vehicle claimed in claim 1, further comprising:
  a transmission state detection unit that detects a power transmission state on the driven side; and
  an increase rate correction unit that corrects to decrease the increase rate of the deceleration by the deceleration control unit, when the transmission state detection unit has detected that the power transmission state has reduced from a steady state, and thereafter detected recovery to the steady state.

14. The deceleration control device for a vehicle claimed in claim 13, wherein the transmission state detection unit determines;
  that the power transmission state has reduced from the steady state when a shift position of a transmission has been detected to change from a driving position to a non-driving position, and
  that recovery to the steady state when the shift position has thereafter returned from the non-driving state to the driving state.

15. The deceleration control device for a vehicle claimed in claim 13, wherein the transmission state determination unit determines:
  that the power transmission state has reduced from the steady state when a slip tendency of a drive wheel is detected, and
  that recovery to the steady state when the slip tendency has thereafter been detected to converge.

16. The deceleration control device for a vehicle claimed in claim 13, wherein the increase rate correction unit corrects to decrease the increase rate of the deceleration by the deceleration control unit by correcting to decrease the first increase rate.

17. The deceleration control device for a vehicle claimed in claim 13, wherein the increase rate correction unit corrects to decrease the increase rate of the deceleration by the deceleration control unit by correcting to decrease the second increase rate.

18. The deceleration control device for a vehicle claimed in claim 13, wherein the increase rate correction unit corrects to decrease the increase rate of the deceleration by setting the first increase rate to zero, and then increasing the deceleration by the second increase control unit at a second increase rate.

19. A deceleration control method for a vehicle, in which deceleration is imparted to the vehicle when a power source of the vehicle is driven from a driven side, the method comprising:
  increasing the deceleration due to the power source deceleration at a first increase rate when a driver holds a brake operation;
  increasing the deceleration at a second increase rate that is less than the first increase rate, when the driver holds the brake operation and has increased the deceleration by the power source deceleration at the first increase rate for a predetermined time.

* * * * *